United States Patent
Bramante et al.

(10) Patent No.: US 11,442,897 B2
(45) Date of Patent: Sep. 13, 2022

(54) OPTIMIZING CONTENT STORAGE THROUGH STUBBING

(71) Applicant: Hitachi Vantara LLC, Santa Clara, CA (US)

(72) Inventors: Richard Bramante, Santa Clara, CA (US); Scott Yaninas, Santa Clara, CA (US); Sowmya Manjanatha, Santa Clara, CA (US); Jerry Shea, Santa Clara, CA (US)

(73) Assignee: HITACHI VANTARA LLC, Santa Clara, CA (US)

( * ) Notice: Subject to any disclaimer, the term of this patent is extended or adjusted under 35 U.S.C. 154(b) by 202 days.

(21) Appl. No.: 16/347,896

(22) PCT Filed: Feb. 13, 2017

(86) PCT No.: PCT/US2017/017593
§ 371 (c)(1),
(2) Date: May 7, 2019

(87) PCT Pub. No.: WO2018/147876
PCT Pub. Date: Aug. 16, 2018

(65) Prior Publication Data
US 2019/0286613 A1    Sep. 19, 2019

(51) Int. Cl.
*G06F 16/16* (2019.01)
*G06F 16/182* (2019.01)
(Continued)

(52) U.S. Cl.
CPC .............. *G06F 16/164* (2019.01); *G06F 7/00* (2013.01); *G06F 9/445* (2013.01); *G06F 15/16* (2013.01);
(Continued)

(58) Field of Classification Search
CPC .... G06F 16/164; G06F 16/152; G06F 16/178; G06F 16/1827; G06F 15/16; G06F 9/445; G06F 7/00; G06F 16/00
See application file for complete search history.

(56) References Cited

U.S. PATENT DOCUMENTS 7,243,346 B1    7/2007  Seth et al.
9,251,114 B1 *  2/2016  Ancin ............... G06F 15/17331
(Continued)

OTHER PUBLICATIONS

International Search Report of PCT/US2017/017593 dated Apr. 24, 2017.
(Continued)

*Primary Examiner* — Hosain T Alam
*Assistant Examiner* — Chongsuh Park
(74) *Attorney, Agent, or Firm* — Mattingly & Malur, PC

(57) ABSTRACT

In some examples, a client device may send, to a service computing device over a network, a request for information related to a change to a file system associated with the client device. In response, the client device may receive, from the service computing device, a list of one or more changes to the file system. The client device may add and/or update metadata for a stub file on the client device based at least partially on the received list of one or more changes. In some cases, the stub file may include a stub data structure stored on the client device, while the file content of the file corresponding to the stub file may be stored at a storage over the network.

17 Claims, 13 Drawing Sheets

(51) Int. Cl.
   *G06F 16/178* (2019.01)
   *G06F 16/14* (2019.01)
   *G06F 7/00* (2006.01)
   *G06F 9/445* (2018.01)
   *G06F 15/16* (2006.01)
   *G06F 16/00* (2019.01)

(52) U.S. Cl.
   CPC ............ *G06F 16/00* (2019.01); *G06F 16/152* (2019.01); *G06F 16/178* (2019.01); *G06F 16/1827* (2019.01)

(56) References Cited

U.S. PATENT DOCUMENTS

| | | |
|---|---|---|
| 2004/0133540 A1 | 7/2004 | Saake et al. |
| 2013/0282657 A1 | 10/2013 | Besen et al. |
| 2013/0282830 A1* | 10/2013 | Besen .................. G06F 16/185 709/205 |
| 2015/0026237 A1* | 1/2015 | Kaplinger ............... H04L 67/26 709/203 |
| 2015/0032690 A1 | 1/2015 | Hoque et al. |
| 2015/0039557 A1* | 2/2015 | Howard ................ G06F 16/178 707/617 |
| 2015/0347552 A1* | 12/2015 | Habouzit .............. G06F 16/178 707/613 |
| 2016/0212120 A1 | 7/2016 | Bryant et al. |
| 2016/0253352 A1* | 9/2016 | Kluck ................ H04L 67/1095 707/638 |
| 2017/0308602 A1* | 10/2017 | Raghunathan ........ G06F 16/273 |

OTHER PUBLICATIONS

Extended European Search Report received in corresponding European Application No. 17895916.9 dated Jul. 31, 2020.
Japanese Office Action received in corresponding Japanese Application No. 2019-533150 dated Aug. 20, 2020.
Office Action issued In corresponding European Application No. 17895916.9 dated Jan. 24, 2022.

* cited by examiner

1100

```
┌─────────────────────────────────────────────────────────────────────┐
│ SECOND CLIENT DEVICE GENERATES FIRST FILE AT SECOND CLIENT DEVICE;  │
│ THE FIRST CLIENT DEVICE HAS NO LOCAL REPRESENTATION OF THE FIRST FILE│
│                               1102                                  │
└─────────────────────────────────────────────────────────────────────┘
```

SECOND CLIENT DEVICE SENDS THE FIRST FILE METADATA AND FIRST FILE CONTENT TO THE SERVICE COMPUTING DEVICE FOR SYNCHRONIZATION
1104

FIRST CLIENT DEVICE RECEIVES FILE SYSTEM CHANGE NOTIFICATION FROM THE NOTIFICATION SERVICE ON THE SERVICE COMPUTING DEVICE
1106

THE FIRST CLIENT DEVICE SENDS A REQUEST FOR INFORMATION ABOUT THE FILE SYSTEM CHANGES AND TOKEN TO THE TRANSACTION QUERY ENGINE
1108

THE FIRST CLIENT DEVICE RECEIVES CHANGE INFORMATION FROM THE TRANSACTION QUERY ENGINE, E.G., PATH, EVENT, SIZE, MODIFICATION TIME, AND NEW TOKEN
1110

THE FIRST CLIENT DEVICE PROCESSES THE FILE SYSTEM CHANGE INFORMATION, CHECKS THE STATE OF LOCAL FIRST FILE, AND DETERMINES THAT THERE IS NO LOCAL REPRESENTATION
1112

THE FIRST CLIENT DEVICE DETERMINES FROM THE STORAGE MANAGEMENT POLICY THAT THE FIRST FILE IS TO BE MAINTAINED IN A MIRRORED CONFIGURATION SO THAT UPDATES TO FIRST FILE CONTENT ARE STORED IN THE LOCAL STORAGE ON THE FIRST CLIENT DEVICE
1114

THE FIRST CLIENT DEVICE DOWNLOADS THE FILE CONTENT OF THE FIRST FILE AND APPLIES ADDITIONAL METADATA TO THE METADATA INCLUDED IN THE CHANGE INFORMATION RECEIVED FROM THE TRANSACTION QUERY ENGINE
1116

LOCAL OPERATING SYSTEM VIEW OF FILE SYSTEM ACCESSED BY FIRST CLIENT REFLECTS UP-TO-DATE REPRESENTATION OF THE FILE SYSTEM WITH THE FIRST FILE CONTENT MIRRORING THE UP-TO-DATE FILE CONTENT STORED ON THE NETWORK STORAGE
1118

FIG. 11

OPTIMIZING CONTENT STORAGE THROUGH STUBBING

TECHNICAL FIELD

This disclosure relates to the technical field of storing data on computing devices.

BACKGROUND

A stub file may be a computer file or other data object that appears to a user or application to be stored in a first storage location, but the content of the file may be actually stored in whole, or in part, at a different storage location. Thus, when the user or application attempts to access the content of the file by accessing the stub file, the access request may be intercepted and the content of the file may be retrieved from the actual storage location. As one example, conventional file stubbing has been used to represent a one-to-one relationship between a first storage location and a second storage location for particular file content.

SUMMARY

Some implementations include creating a stub file on a client device and storing content of the stub file at a storage over a network. Metadata of the stub file on the client device may be kept up to date through the techniques described herein. As an example, a client device may send, to a service computing device over a network, a request for information related to a change to a file system associated with the client device. In response, the client device may receive, from the service computing device, a list of one or more changes to the file system. The client device may add and/or update metadata for a stub file on the client device based at least partially on the received list of one or more changes. In some cases, the stub file may include a stub data structure stored in a local storage on the client device. Further, the file content of the file corresponding to the stub file may be stored at a storage over the network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 11 is a flow diagram illustrating an example process for mirroring data according to some implementations.

DESCRIPTION OF THE EMBODIMENTS

Figure 1:
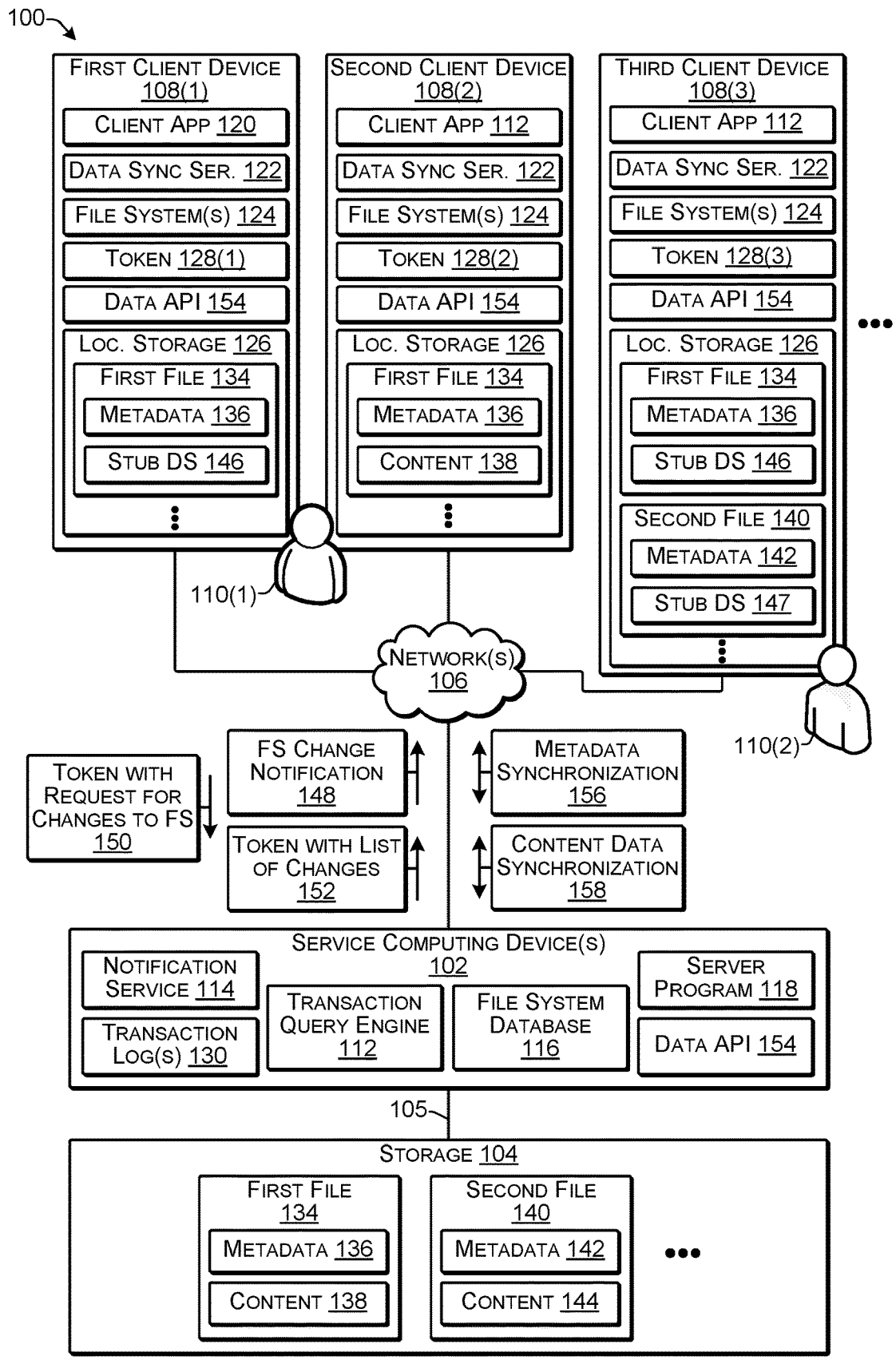
FIG. 1 illustrates an example logical architecture of a system configured to provide content storage with stubbing according to some implementations.

Some implementations herein are directed to techniques and arrangements for managing files and data storage. As one example, client devices may be in communication with a service computing device, and some of the client devices may store only stub file metadata of some user files, while both the file metadata and file content of those files may be stored on some other ones of the client devices and on the service computing device. When a user or application tries to access file content of a stub file, the file content may be immediately downloaded from the service computing device. Further, the files may be synchronized across multiple client devices so that the stub file metadata reflects the latest version and condition of each file. Thus, storage capacity on individual client devices may be managed by storing file content of only some files on the individual client device, while file content of all the files is stored on the service computing device.

In some cases, a notification service may be a program that is executable on the service computing device able to provide, to listening clients, a change notification event for particular changes to storage locations. Further, a transaction query engine may be a program that is executable on the service computing device that is able to provide, to requesting clients, a chronological listing of file change transactions that occur for storage locations over a particular time period. The transaction query engine may perform a process to keep the local virtual representation of a stub file data up to date by providing file system change information for updating the metadata of the stub file. In addition, a data synchronization service may be a program that is executable on the client computing device to register for change notifications from the notification service and to request updates from the transaction query engine based on change notifications.

Some examples allow clients running in low-storage-space environments to present a full virtual view of stored information on the client device even though a large portion of the content data may be stored at a network storage location. For instance, the system herein allows client devices to easily recall offloaded file content for local access on an as-needed basis. Further, the system having the notification service, transaction query engine, and data synchronization service processing herein may allow all client devices participating in shared file systems to maintain an up-to-date view of the file system despite modifications from one or more other client devices.

In some cases, the notification service may use a token that acts as a cursor to track changes for a particular storage set, e.g., a file system, that is defined between the service computing device and one or more client devices. This file system may be private to a particular client device or shared among multiple client devices. Each client device may use its token to track file system events. Changes to the file system received by the service computing device may cause the service computing device to change the token used by the service computing device for the file system. Using a token exchange, the client device may be notified if there have been any changes to a file system in which the client device has a registered interest. The notification service may report to one or more registered client devices that a change to a file system associated with the client device has been received at the service computing device, but the notification service might not report the actual changes to the particular file system.

The data synchronization service running on the client device may register with the notification service to receive notifications of file system change events affecting a registered file system. When the notification service reports that there are unprocessed changes in the file system associated with the client device, the data synchronization service on the client device may send a request to the transaction query engine to retrieve a list of the specific changes. The transaction query engine determines and sends the list of specific changes to the requesting client device. The transaction query engine may use tokens to track events for corresponding file systems. The client device may send its most recently received token with a request that the transaction query engine return changes that have occurred in one or more specified file systems since the client device's token was last updated. This allows the client device to process only file system events of which the client device is not previously aware. The data synchronization service on the client device may process the list of changes reported by the transaction query engine based on the local configuration on the client device. This processing may include downloading file content for mirrored configurations, creating or updating stub metadata for stub configurations, or removing a local representation of the file data and/or stub metadata entirely in cases where a particular file was removed from the service computing device.

Implementations herein enable stub file metadata residing on client devices to be updated and synchronized with a network storage version of the file maintained by the service computing device, such as in the situation of a many-to-one client device-to-service computing device relationship. For instance, some examples include an environment in which the data that resides at the service computing device is able to be shared across multiple client devices equally based on shared file systems. Accordingly, any client device may be permitted to change the data and the resulting change may result in all the client devices that share the data receiving respective notifications to update their local stub file states so that their respective local virtual representations of the stub files remain up to date in response to the change.

In some examples of the file stubbing techniques herein, file data may be relocated from one service computing device or network storage location to another while maintaining a local, compact representation of the original file on the client device so that file content can easily and seamlessly be recalled back to the client device from the service computing device if requested. Examples herein enable multiple clients to freely represent local data as defined by local policy. For instance, a first client device may be configured to use a mirroring policy, so that changes to the content of a file on the service computing device are immediately recalled down to the first client device, whereas a second client device may be configured to use a stubbing policy for the file, so that changes to the content of the file on the service computing device results in only stub file metadata being updated on the second client device without the actual file data being sent to the second client device. In addition, any single client device may partition its data view so that the client device is able to interleave both mirrored and stub data on the same client device. For instance, a storage administrator may choose to flag a certain data set to remain resident (i.e., pinned) to the particular client for performance reasons while allowing less frequently accessed data to be maintained as stub files. Further, the client devices may be configured to operate in either a non-synchronizing mode or a synchronizing mode.

In some cases, communication between the client devices and the service computing device may be performed via a REST (representational state transfer) based API (application program interface) or other data API. The service computing device may detect the mode of operation of the client device via the data API, which may include client modes of operation. In some examples, the service computing device may be setup in a two node configuration and therefore may be always online. The service computing device may further employ a backend storage to store the client device data, such as through a storage area network, cloud storage, or other network based storage.

For discussion purposes, some example implementations are described in the environment of one or more service computing devices in communication with one or more network storage locations and a plurality of client devices for managing storage of files and other data. However, implementations herein are not limited to the particular examples provided, and may be extended to other types of computing system architectures, other types of storage environments, other types of client configurations, other types of data objects, and so forth, as will be apparent to those of skill in the art in light of the disclosure herein.

FIG. 1 illustrates an example logical configuration of a system 100 configured for storing data objects and associated metadata according to some implementations. The system 100 includes one or more service computing devices 102 that are able to communicate with, or otherwise coupled to, a storage 104, such as through one or more networks 105. Further, the service computing device 102 may be able to communicate over one or more networks 106 with one or more client computing devices 108, such as client computing devices 108(1), 108(2), 108(3) . . . (hereinafter "client devices"), which may be associated with one or more users 110. In this example, suppose that the first client device 108(1) and the second client device 108(2) are associated with a first user 110(1), and the third client device 108(3) is associated with a second user 110(2). Further, while three client devices 108 and two users 110 are shown in this example, in other examples, there may be any number of client devices 108 and associated users 110.

The one or more networks 105 and 106 may include any suitable network, including a wide area network, such as the Internet; a local area network (LAN), such as an intranet; a wireless network, such as a cellular network, a local wireless network, such as Wi-Fi and/or short-range wireless communications, such as BLUETOOTH®; a wired network including Fibre Channel, fiber optics, Ethernet, or any other such network, a direct wired connection, or any combination of the foregoing. Accordingly, the one or more networks 105 and 106 may include both wired and/or wireless communication technologies, and in some examples, the network(s) 105 and 106 may include the same one or more networks.

Components used for such communications can depend at least in part upon the type of network, the environment selected, or both. Protocols for communicating over such networks are well known and will not be discussed herein in detail. Accordingly, the service computing device 102 and client devices 108 are able to communicate over the one or more networks 106 using wired or wireless connections, and combinations thereof. Further, in some cases, a load balancing computing device (not shown in FIG. 1) may be located between the service computing device 102 and the client computing devices 108. Additionally, in some examples, the network(s) 105 may be a LAN and/or storage area network, and the service computing device 102 and the storage 104 may be located locally to each other.

Each service computing device 102 may include a transaction query engine 112, a notification service 114, a file system database 116, and a server program 118. For example, the server program 118 may interact with respective client applications 120 on the respective client devices 108 such as for serving files from the storage 104 and/or receiving files from the client devices 108 for storage in the storage 104.

The client devices 108 may each include the client application 120, a data synchronization service 122, one or more file systems 124, a local storage 126, and a token 128. Each client device 108 may include a respective instance of the client application 120 that may execute on the respective client device 108, such as for communicating with the server program 118 for sending user data for storage on the storage 104 and for retrieving data from the storage 104.

As discussed additionally elsewhere herein, the respective token 128 associated with each client device 108 may apply specifically to the current configuration of that client device 108, respectively. Thus, a token 128(1) associated with the first client device may be different from a token 128(2) associated with the second client device 108(2), and a token 128(3) associated with a third client device 108(3) may be different from the tokens 128(1) and 128(2). Each token 128 may act as a cursor to track changes for a particular storage set, such as a file system, that is defined between the service computing device 102 and each client device 108 (e.g., based on a user account associated with the client device 108).

The file system(s) 124 may include private file systems that may be private to a particular client device 108 and/or shared file systems that may be shared among multiple client devices 108. Each user may have a private file system that may be used across multiple client devices associated with the respective user. Private file systems may typically be accessed only by the respective user. Further, some users may be members of one or more shared file systems and may share files in those file systems with other users who are also members of the same one or more shared file systems. For instance, the shared filed systems to which a user belongs may be mounted at mount points under the user's private file system.

Each client device 108 may use its respective token 112 to receive updates for file system events, such as updates or other changes to files in the file system(s) 124. The service computing device 102 may keep track of the file systems 124 of the client devices 108 through the file system database 116, which may be any type of data structure for maintaining information about the file systems 124 and the associated client devices 108. For example, the file system database 116 may relate particular user accounts and associated login credentials of particular users 110 to particular respective file systems 124. Changes to the file system(s) 124 received by the service computing device 102 may cause the server program 118 and/or the transaction query engine 112 to update a transaction log 130 used by the transaction query engine 112 with changes to a particular file system for tracking updates to the respective file system(s) 124 at the client devices 108.

In the example of FIG. 1, suppose that there is a first file 134 that includes first file metadata 136 and first file content 138, and a second file 140 that includes second file metadata 142 and second file content 144. Additionally, while the metadata 136, 142 for the files 134, 140 is shown as being stored with the file content 138, 144, respectively, in this example for convenience of discussion, in practice, at least some of the metadata 136, 142 may be stored in the data structure of the file system(s) 124 in which the file resides, and thus may be stored at a separate storage location from the file content. As another alternative, at least some metadata may be stored in a separate metadata database (not shown in FIG. 1).

In this example, the first file 134 may be a shared file that is included in a shared file system that is shared by the first user 110(1) and the second user 110(2), and the second file may be a private file that is included in a private file system of the second user 110(2) that is not shared with the first user 110(1). Furthermore, each client device 108 may have a storage management policy (not shown in FIG. 1) that specifies that certain files are maintained as stub files so that only metadata of the stub file is stored in the local storage 126 while the file content of the file is stored at the network storage 104, and certain other files are stored with both the file metadata and the file content of the file in the local storage 126. For example, files that a user is likely to access frequently may be stored on the local storage 126, while files that the user is likely to access infrequently may be stubbed such that only the metadata of the file is stored locally.

In some cases, a stub data structure may be stored in the local storage 126 in addition to other metadata for each stub file. As discussed additionally below with respect to FIG. 2, the stub data structure may include additional metadata related to the particular file, such as a hash of the up-to-date file content, an indication of whether the content for the file is present in local storage, and software version information. In this example, the first file 134 is maintained as a stub file on the first and third client devices 108(1) and 108(3), and the first file is fully maintained with the file content on the second client device 108(2). Accordingly, a stub data structure 146 that includes some metadata for the first file 134 is stored in the local storage 126 of the first client device 108(1) and the third client device 108(3), while the content 138 of the first file 134 is stored in the local storage 126 of the second client device 108(2).

Similarly, the second file 140 is maintained as a stub file on the third client device 108(3). Accordingly, a stub data structure 147 that includes some metadata of the second file 140 is stored in the local storage 126 of the third client device 108(3)), while the content 144 of the second file 140 is stored at the network storage 104 managed by the service computing device 102.

The storage management policy for determining which files to maintain as stub files and which files to store the file content locally may be determined based on the files being stored in a particular folder or directory in the file system, based on the files or folders or directories being selected by an administrator or by default, based on the files having been recently accessed, based on the files being selected by the user, and/or various other techniques. In some cases, for some client devices 108, such as those having limited storage capacity (e.g., portable devices), the storage management policy may have a default setting such that all user files are stored as stub files except for a specified group of files, type of files, recently accessed files, etc. Additionally in some cases, for other types of client devices 108, such as workstations or desktops with large storage capacity, only certain files might be stored as stub files, such as those files that exceed a specified file size and that are accessed infrequently. For instance, after a file over a specified file size has not been accessed for a specified period of time, the content of the file may be deleted from the local storage 126 and may be maintained only at the network storage 104, while the metadata for the file may be maintained in the local storage 126 of the client device 108 and may be kept up to date using the techniques herein.

In some cases, the client application 120 may be configured to present a user interface to enable the user to specify particular files, particular folders, particular directories, etc., that are stubbed, not stubbed, stubbed after passage of a specified period of time, or the like. For instance, the default storage management policy may be that most or all files are stub files, and the user or a system administrator may specify particular files, folders, etc., that are not stub files.

The data synchronization service 122 may be executed on each client device 108 to register with the notification service 114 for receiving notifications of events affecting a file system configured on the client device 108. The client device 108 may be notified by the notification service 114 if there has been a change to a file system 124 for which the particular client device 108 has registered. In some examples, an HTTP (hypertext transfer protocol) server push technique or and HTTP long-polling technique may be used for notifying the client devices 108 of changes to a respective file system 124.

For instance, in the case of HTTP long polling, the client device 108 may periodically send HTTP/S (secure HTTP) requests to the service computing device 102 with the expectation that the service computing device 102 may not respond immediately. In particular, if the service computing device 102 has no new information for the client device 108 when the request is received, then rather than sending an empty response, the service computing device 102 may hold open the request and wait for change to any of the file system(s) 124 that are the subject of the request. After the service computing device 102 receives an indication of a change to a corresponding file system, the notification service 114 may immediately send an HTTP/S response to the client device(s) 108 registered for that file system, completing the open HTTP/S request. Upon receipt of the HTTP/S response from the notification service 114, the client device 108 may be configured to issue another HTTP/S request to the service computing device 102 so as to receive any subsequent push notifications of any additional file system changes. In addition, the client device 108 may issue a request to the transaction query engine 112, as discussed additionally below to receive details of the update.

Additionally, or alternatively, the request from the client device 108 to the notification service 114 may include a token that acts as a cursor to track changes for a particular file system that is registered for the client. The token may identify the file system and the most recent file system transaction for which the client has received update information from the transaction query engine 112. In some examples, the token may be the same as the token 128 previously provided by the transaction query engine 112 to the client device 108, while in other examples, the token may merely include the file system identifier and last transaction number received by the client device. Thus, each client device 108 may track which file system transactions have been seen and assimilated by the client device 108 based on their respective tokens. When the notification service 114 receives the token 128 from the client device 108, the notification service 114 may check the transaction log 130 corresponding to the identified file system to determine whether there is a more recent transaction in the transaction log 130 than the transaction listed in the token 128. If there is a more recent transaction in the transaction log than in the token 128, the notification service 114 may send a response to the client device 108 indicating that there has been a change to the file system. Additionally, in the case that the token used by the notification service 114 is different from the token 128 used by the transaction query engine 112, the notification service may update the token based on the changes to the file system, and may send the updated token to the client device 108 for use the next time that the client device makes a query to the notification service 114. In either event, using a token exchange, the client device 108 may be notified when there has been any change to a file system in which the client device is interested.

Accordingly, using the techniques discussed above or other techniques, when a file in a particular file system is created, changed, or deleted, the notification service 114 may send a file system change notification 148 to one or more registered client devices 108 indicating that a change to the particular file system has been received at the service computing device 102. As mentioned above, in some examples, the file system change notification 148 may include an updated notification token. For instance, the notification service 114 may refer to the file system database 116 to determine which clients 108 are waiting for change notification for which file systems, and may direct the file system change notification 148 to only those client devices 108 for which a change to the file system has been received. Further, in some examples, the notification service 114 may indicate in the change notification 148 that there has been a change to the particular file system, but might not report what the actual changes are that caused the notification.

When the notification service 114 sends a file system change notification 148 indicating that there are unprocessed changes in a client device's file system, in response, the data synchronization service 122 of the targeted client device 108 may be configured to send a request to the transaction query engine 112 to request a list of the specific changes. The transaction query engine 112 may determine the information from the transaction log 130 and/or directly from the storage 104, and may send the list of specific changes to the requesting client device 108 with an updated token 128. For example, the transaction query engine 112 may use the tokens 128 to track events for corresponding file systems based on transaction identifiers included in the tokens 128, as discussed additionally below.

Upon receiving a file system change notification from the notification service 114, the data synchronization service 122 on the client device 108 may send the client device's current token 128 with a request 150 to the service computing device 102. The transaction query engine 112 may receive the token and request 150 for changes to the file system, and based on the information contained in the received token, may return changes that have occurred in one or more specified file systems since the client device's token was last updated. This allows the client device 108 to process only events of which the client device is not previously aware. The data synchronization service 122 processes the list of changes reported by the transaction query engine 112 based on the local configuration on the client device 108. This processing may include downloading file content for mirrored file configurations, creating or updating stub metadata for stub file configurations, or removing a local representation of the data entirely in cases where a particular file was removed from the storage 104.

When a user or application tries to access content of a file that is a stub file, such as the first file 134 on the first client device 108(1), the client application 120 may include an operating system level component that intercepts the access request, determines that the content 138 for the requested file is not maintained locally, and sends a request to the service computing device 102 for the content 138. As one example, in the case that the client device 108 is using a WINDOWS® operating system, the client application 120 may include or may employ a WINDOWS® file system filter driver that is configured to intercept file access requests directed to files that are stubbed. The file system filter driver may be a kernel-mode component able to filter file operations for one or more file systems or file system volumes. Similar operating-system-level file operation interception techniques may be used on client devices 108 that employ different operating systems.

When the request to access the stub file content is intercepted, the client application component may redirect the request to the service computing device 102. The server program 118 on the service computing device 102 may retrieve the file content from the storage 104 and send the file content to the requesting client 108. In some cases, the client application 120 may employ a data API 154 to communicate with the service computing device 102, and the service computing device may respond according to the data API 154. As mentioned above, in some examples, the data API 154 may be a REST API. When the file content has been received from the service computing device 102, the file system filter driver may respond to the requesting application and/or the user on the client device 108 in a manner similar to that as if the file content had already been maintained in local storage.

In the example of FIG. 1, suppose that the second client 110(2) accesses the first file 134, using the client application 112, the operating system (not shown in FIG. 1) on the third client device 108(3), or an application (not shown in FIG. 1) on the third client device 108(3). The client application 112 may obtain the file content 138 for the first file from the service computing device 102, as discussed above. Further, suppose that the second user 110(2) makes a change to the first file and saves the change to the local first file on the local storage 126, and closes the first file 134. The change to the first file 134 may be synchronized to the service computing device 102 by the data synchronization service 122 on the third client device 108(3). For example, the updated file content and metadata may be sent to the server program 118, which may store the updated file content and metadata in the storage 104. Further, the server program 118 may update the transaction log 130 to indicate changes to the shared file system shared by the first user 110(1) and the second user 110(2), such as by incrementing a transaction identifier for the shared file system in the transaction log 130 and including details of the changes to file in the shared file system.

In response to receiving the file system change information, the notification service 114 on the service computing device 102 may determine from the file system database 116 that the first client device 108(1) and the second client device 108(2) are registered to receive change notifications for the shared file system. Accordingly, the notification service 114 may send a file system change notification 148 to each of the first client device 108(1) and the second client device 108(2). In response, first client device 108(1) and the second client device 108(2) may each send its current token 128(1) and 128(2), respectively, with a respective request 150 for changes to the shared file system.

In response, the transaction query engine 112 may compare the transaction identifier in the received tokens 128(1) and 128(2) with the latest transaction identifier in the transaction log 130, and may determine which transactions are to be updated at each of the respective first client device 108(1) and the second client device 108(2). In this example, suppose that there is only the one change to the first file 134. Thus, the transaction query engine 112 may send a revised token with a list 152 of changes to each of the first client device 108(1) and the second client device 108(2).

Consequently, the data synchronization service 122 on the first client device 108(1) may perform metadata synchronization 156 only, since only a stub file of the first file 134 is maintained on the local storage 126 of the first client device 108(1). Furthermore, the data synchronization service 122 on the second client device 108(2) may perform both metadata synchronization 156 and content data synchronization 158, since the file content 138 is stored in the local storage 126 on the second client device 108(2).

Accordingly, in implementations herein, the client devices 108 are assigned access to particular file systems based on user accounts and login credentials associated with particular client devices 108. For example, each user account may be associated with at least one private file system (e.g., only devices associated with a particular user account are allowed to read/write the file system) or shared (e.g., multiple devices associated with multiple user accounts are allowed to read/write the file system). This information may be maintained and tracked in the file system database 116.

In some cases, the service computing device 102 may store a respective transaction log 130 for each respective file system registered with the service computing device 102. Each file system change event (create, delete, modify) for a file system may have a corresponding entry in the transaction log 130 for that file system and may have a corresponding transaction identifier associated with it. For instance, the transaction identifier may be generated by the server program 118 and/or the transaction query engine 112 when the transaction log 130 is updated.

Additionally, as mentioned above, each client device 108 may have an associated storage management policy (not shown in FIG. 1) that indicates which files are stub files, which files are mirrored from the service computing device 102, and so forth. Based on the storage management policy, a client device may be configured such that the data synchronization service 122 stubs local files so that storage requirements on the local storage 126 are minimized to conserve storage space. For example, the stub data management techniques herein may be used on a client device 108 with limited storage capacity to enable user access to a wide array of data without allowing all the data to remain resident in the local storage at all times. When the data synchronization service 122 determines to stub a file or other data based on the storage management policy, the data synchronization service 122 may first ensure that the service computing device 102 has received an up-to-date full copy of the file content that is to be deleted from the local storage 126. The data synchronization service 122 may then create a stub file including a stub file data structure in the local file system to represent the removed content data.

Furthermore, the client device 108 may maintain a set of metadata values in its file system for each file (e.g., file size of the file content, time at which the file content was last modified, file path of the file content, etc., as enumerated elsewhere herein), and which may correspond the metadata 136 of the first file 134 in some examples. This metadata may be used to represent the file data to the operating system on the client device 108 and/or to the user even though the stub data structure itself is only a small placeholder and the actual content of the file is not present on the client device 108. In some examples, the storage location of the metadata may be implementation dependent. For instance, the metadata values may be stored within the file system itself or, in other examples, may be maintained in a separate metadata database.

In examples herein, the client devices 108(1) and 108(3) may associate the stub data structure 146 with its corresponding set of metadata 136 to present a virtual representation of the first file 134. The data of a file may be stubbed by the client device 108 based at least partially on a local event or a remote event (e.g., on the service computing device 102 or another client device). For example, the data synchronization service 122 on the client device 108 may decide to convert a locally stored file to a stub file to free up local disk space based on the storage management policy associated with the client device 108. Additionally, as another example, when participating in a shared folder, the data synchronization service 122 on the client device 108 may decide to represent file creations performed at other client devices initially as stub files so that the costs in bandwidth to transfer the file content and local disk space to hold the file content are not incurred unless the file content is explicitly requested by a user or process running on the client device 108.

Furthermore, in the case that the first user and the second user are both updating the same file at the same time, the user that saves the changes first may have the changes pushed by the respective client device 108 to the service computing device 102 before the other user. The service computing device 102 may assign a version number to the updated file. Subsequently, if the other user saves the changes, the service computing device 102 may detect that the file has already been updated from the previous version based on the associated file version numbers. In this case, the other user may be notified that the file has already been modified and that the changes made by the other user have been saved using a different file that is separate from the updated original file. The other user may then resolve the conflict by determining whether to merge or otherwise incorporate the changes into the already updated version, or the like.

Figure 2:
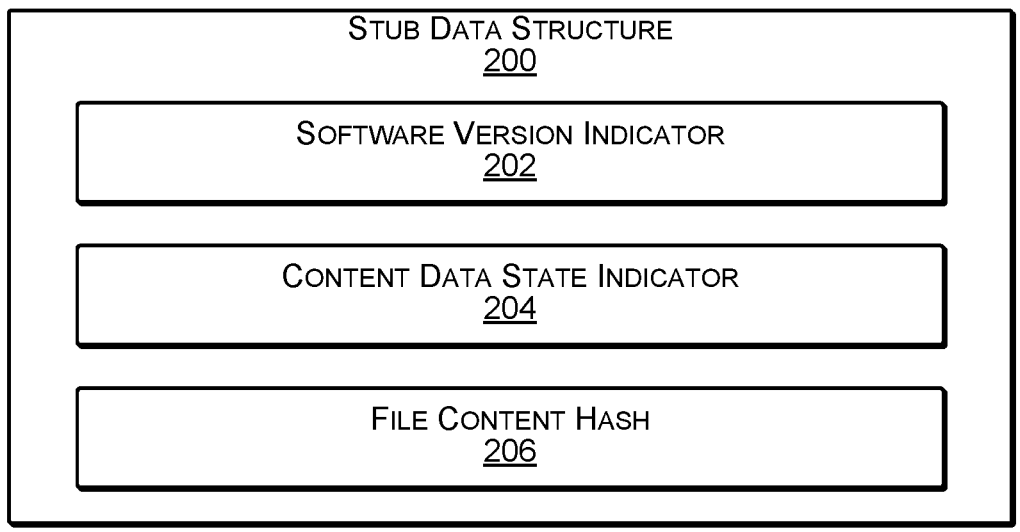
FIG. 2 illustrates an example stub data structure according to some implementations.

FIG. 2 illustrates an example stub data structure 200 according to some implementations. For instance, the stub data structure 200 may correspond to the stub data structure 146 of the first file 134 discussed above or other stub data structures discussed herein. In some cases, the stub data structure 200 is an actual data object of stub file metadata stored in the file system in the local storage of a client device in place of file content, while other metadata for each stub file may be maintained by the file system in which the file is stored, or in a separate metadata database. For example, metadata values for file metadata such as the file size, file modification time, file path, file version, and so forth may be maintained by the file system as for any other non-stub file.

In this example, the stub data structure 200 includes a software version indicator 202, a content data state indicator 204, and a file content hash 206. The software version indicator 202 may indicate the version of software (e.g., the version of the client application and/or data synchronization service) that was used to generate the stub data structure 200, which information may be used to maintain compatibility of the stub data structure 200 with future software versions. Further, the content data state indicator 204 may indicate whether the file content of the file corresponding to the stub is currently located in the local storage or is currently stored remotely at the network storage 104. For example, the content data state may be indicated by one or more flags, dirty bits, or the like. In addition, the file content hash 206 may be a hash of the most recently updated version of the file content for the stub file. For example, the file content hash 206 may be used to verify that the stub data structure is associated with the correct file content when the file content is retrieved and/or may be used to locate corresponding content for a misnamed stub, or the like. Any suitable hash function may be used, such as SHA-1, SHA-3, MD-5, etc., to generate the file content hash 206 from the file content.

Figure 3:
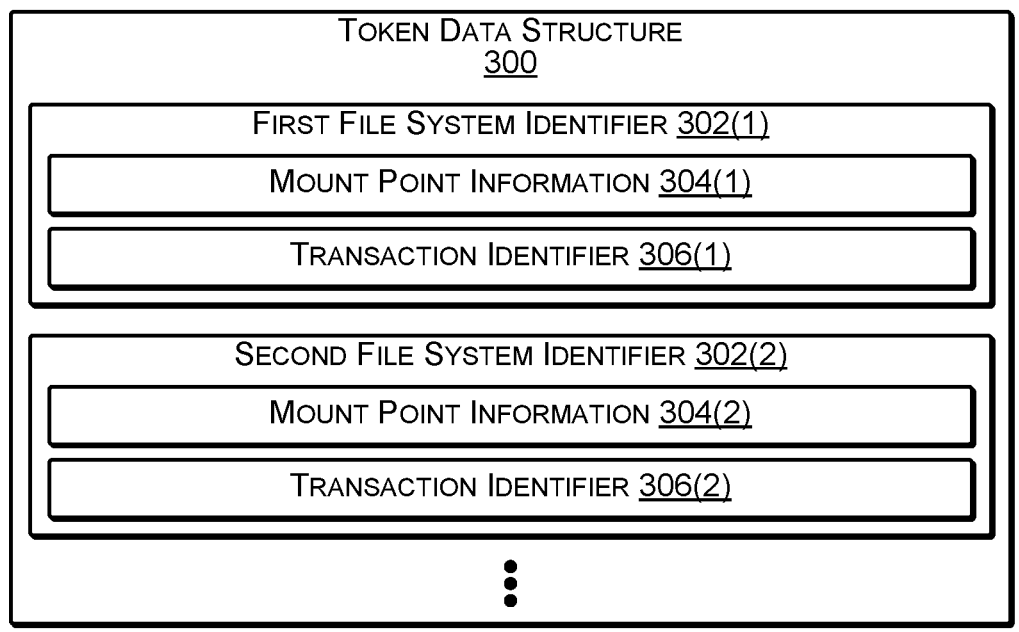
FIG. 3 illustrates an example of a token data structure according to some implementations.

FIG. 3 illustrates an example of a token data structure 300 according to some implementations. The token data structure 300 may correspond to the tokens 128 discussed above that may be issued by the transaction query engine 112 along with a list of updates to the file system(s) at the client device according to some implementations. In this example, the token data structure may include one or more file system identifiers 302, such as first file system identifier 302(1), a second file system identifier 302(2), and so forth. For each file system identifier 302 included in the token data structure 300, the token data structure 300 may include associated mount point information 304 and an associated transaction identifier 306. For example, the first file system identifier 302(1) is associated with first mount point information 304(1) and a first transaction identifier 306(1), and the second file system identifier 302(2) is associated with second mount point information 304(2) and a second transaction identifier 306(2).

For instance, the file system identifier 302 may indicate a file system that is maintained by the corresponding client device. The mount point information 304 may be used to indicate what information stored in the file system (e.g., folders, files, etc.) is information that is shared with other client devices, and which information is private information for the client device. Further, the transaction identifier 306 may include transaction identifier information that may include information uniquely identifying or otherwise individually distinguishing each transaction within the file system. As one example, the transaction identifiers may be sequentially assigned numbers that are assigned to transactions as they are entered into the transaction log discussed above. Further, as mentioned above, the transaction query engine 112 may send a newly generated token to a client device in response to receiving a previously-issued token from the client device.

FIGS. 4-11 are flow diagrams illustrating example processes according to some implementations. The processes are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, frameworks, and systems described in the examples herein, although the processes may be implemented in a wide variety of other environments, frameworks, and systems.

Figure 4:
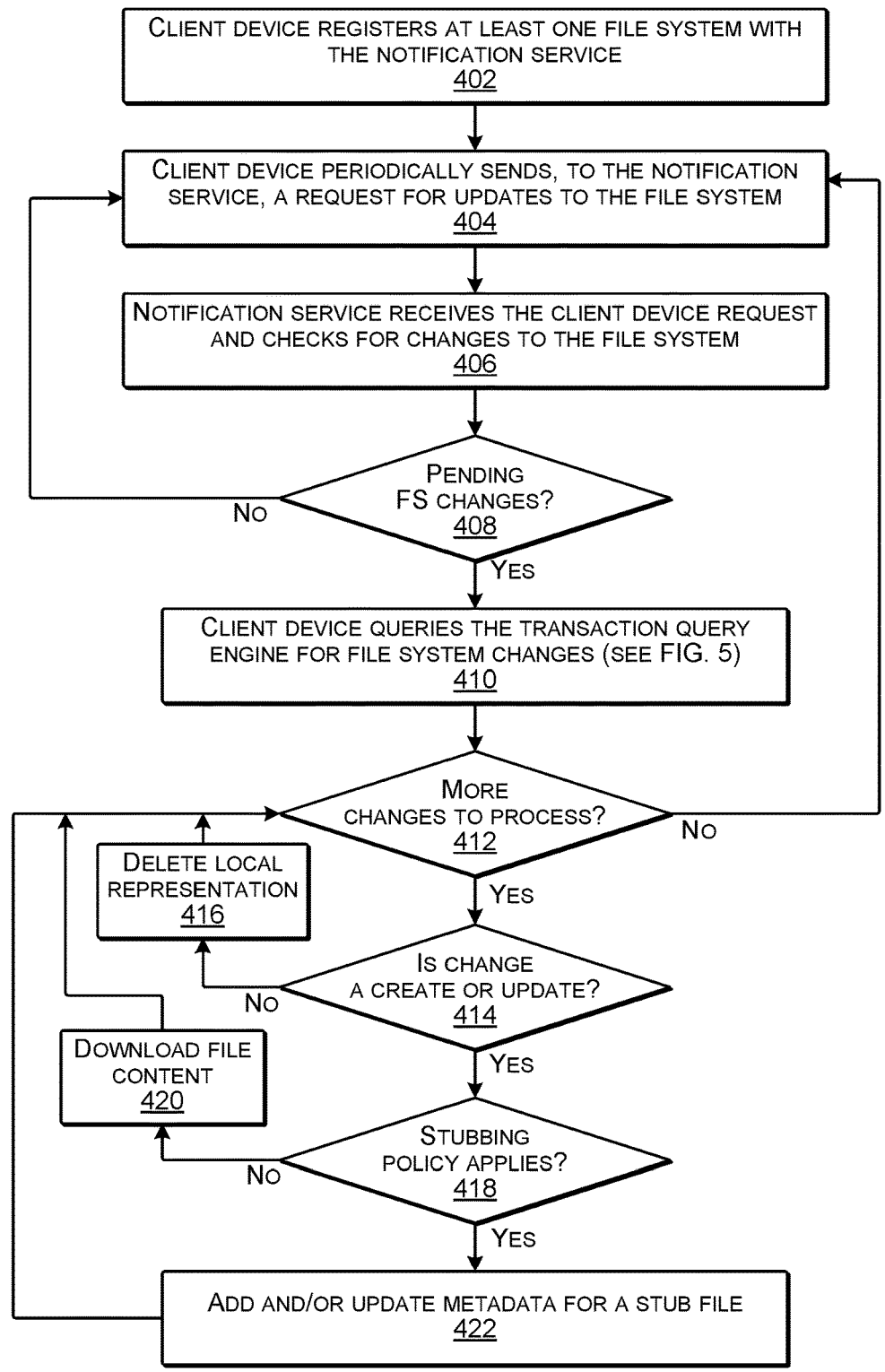
FIG. 4 is a flow diagram illustrating an example process for updating client device data according to some implementations.

FIG. 4 is a flow diagram illustrating an example process 400 for updating client data according to some implementations. In some cases, the process 400 may be executed in part by the client device and in part by the service computing device or other suitable computing device.

At 402, the client device may register at least one file system with the notification service on the service computing device. For instance, the client device may register an associated private file system that is associated with a user account associated with the client device such as through user login credentials or the like. Additionally, in some examples, one or more shared file systems may also be associated with the user account and the private file system of a user.

At 404, the client device may periodically send, to the notification service on the service computing device, a request for updates to the file system. In some examples, the client device may use HTTP long polling or other suitable techniques when sending the request for updates. In addition, in some cases, the client device may include a token with the request for updates, and the token may include at least a file system identifier and a transaction identifier of the most recent file system transaction for which the client data has been updated.

At 406, the notification service on the service computing device may receive the request from the client device and may check for changes to the identified file system. For example, the notification service may refer to a transaction log for the identified file system to determine whether the transaction identifier in the token is the same as the latest transaction identifier in the transaction log.

At 408, if the transaction identifiers are the same then there are no pending changes, the notification service may send a response indicating that there are no updates, and the process may return to block 404. Additionally, in some cases, the response may include the token, which may be the same as the token received from the client device. On the other hand, if the transaction identifiers are not the same, then there are pending changes, the notification service may send a response indicating that there are file system changes, and the process may proceed to block 410. In some examples, the response may include an updated notification token with the updated transaction identifier obtained from the transaction log.

At 410, in response to receiving the indication that there are changes to the file system, the client device may send a request to the transaction query engine for the file system changes. The request may include a token previously received from the transaction query engine the last time that the file system data was updated. For example, the token may include the file system identifier, mount point information, and a transaction identifier, as discussed above with reference to FIG. 3. Details of the process by which the client device queries the transaction query engine are discussed additionally with respect to FIG. 5.

At 412, the client device may receive a response from the transaction query engine and determine whether there are more changes to process. For instance, the client device may determine whether there are any changes listed in the response received from the transaction query engine that have not yet been processed. If there are no more changes to process, the process proceeds to block 404. On the other hand, if there are more changes to process, the process proceeds to block 414.

At 414, the client device may determine whether a change to the file system is a create or update event. If the change is not a create or update event, then that indicates that the change is a delete event, and the process proceeds to block 416. On the other hand, if the change is a create or an update event, the process proceeds to block 418.

At 416, based on determining that the change is a delete event, the process may delete the local representation of the data. For example, in the case of a file, the client device may delete the corresponding file from the local file system. The process may then return to block 412 to determine whether there are more changes to process in the list of changes provided by the transaction query engine.

At 418, in the case that the change is a create or an update event, the client device may determine whether a stubbing policy applies to the data. For example, the client device may determine whether the file is maintained as a stub file at the client device or is maintained as a complete file that includes locally stored file content. The client device may refer to a storage management policy established for the client device when making the determination as to whether stubbing applies to the particular data. If stubbing is applied to the data, the process proceeds to block 422. On the other hand, if stubbing does not apply to the data, then the process proceeds to block 420.

At 420, if the data is not stubbed at the client device, the client device may send a request to the service computing device to download the updated file content for the file. For example, the client device may send a request to the server program on the service computing device to request the updated file content of the corresponding file. Metadata for the file may also be downloaded and/or created/updated locally by the client device.

At 422, if the data is to be maintained as a stub file at the client device, the client device may add and/or update the metadata for the stub file based on the information provided by the transaction query engine. Thus, if a stub file does not already exist on the client device, the client device may add a stub data structure for the stub file and add stub file metadata for the stub file to the file system or other metadata storage location (e.g., a separate metadata database). Alternatively, if the stub file already exists, then the client device may update the stub file metadata. In either event, the change information provided by the transaction query engine may include an up-to-date hash of the content for the file, as well as metadata values for the file size, file path, the type of event performed, the modification time, the file version, the object type, and so forth. As mentioned above, the client device may store metadata values such as the file size, file path, the event type, the modification time, and the file version in the file system data structure on the client device or in a separate metadata database, while the hash of the file content may be stored in, or in association with, a stub data structure stored in the local storage on the client device.

Figure 5:
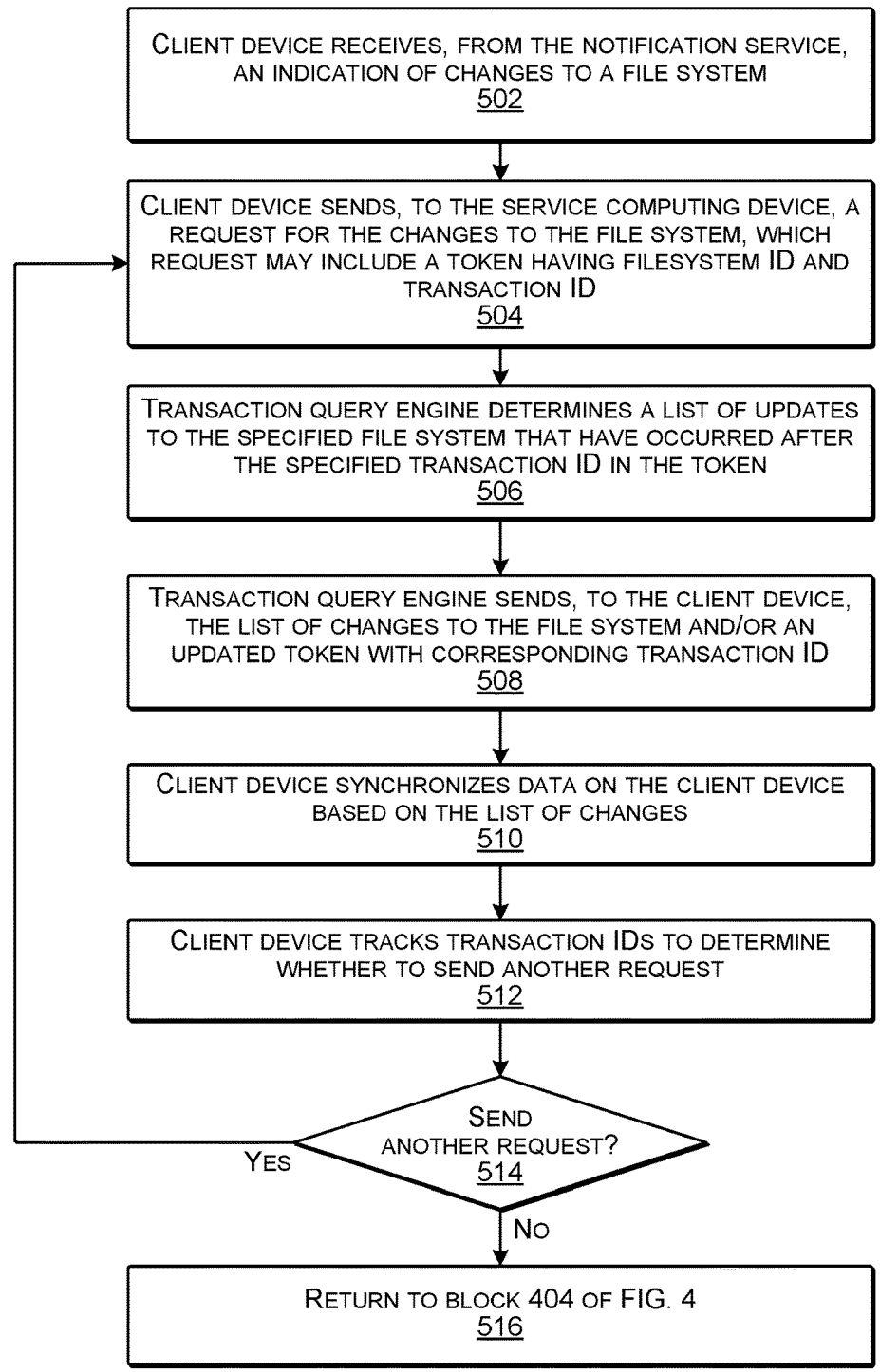
FIG. 5 is a flow diagram illustrating an example process in which the client queries the transaction query engine for changes to a file system according to some implementations.

FIG. 5 is a flow diagram illustrating an example process 500 in which the client queries the transaction query engine for changes to a file system according to some implementations. In some cases, the process 500 may be executed in part by the client device and in part by the service computing device or other suitable computing device.

At 502, the client device may receive, from the notification service on the service computing device, an indication that there are changes to a file system associated with the client device. For example, the notification of file system changes may be received from the notification service based on any of the techniques discussed above, such as in response to a request sent by the client device to the service computing device. Alternatively, in other examples, the notification service may be eliminated and the client device may periodically send a request for updates to the transaction query engine, and include the most recently received token with the request.

At 504, the client device may send, to the service computing device, a request for the changes to the file system. The request sent by the client device may include a token having the file system identifier and a transaction identifier of a transaction for which the client device data has been most recently updated. Additionally, in some examples herein, the token may include mount point information that indicates, e.g., which of the client's data is private data and which is shared data.

At 506, in response to receiving the request from the client device, the transaction query engine on the service computing device may determine a list of updates to the specified file system that occurred after the transaction specified by the transaction identifier included in the token received from the client device.

At 508, the transaction query engine on the service computing device may send, to the client device, the list of changes to the file system and/or an updated token with a corresponding transaction ID. For example, if all the changes to the file system have already been sent to the client device, the transaction query engine may merely return a token including the latest transaction identifier and no list of additional changes.

At 510, the client device may synchronize data on the client device based on the list of changes. Details of the synchronization are discussed above with respect to FIG. 4.

At 512, the client device may track transaction IDs to determine whether to send another request. For example, if the transaction identifier in the most recent token received from the transaction query engine matches the transaction identifier of a previously received token and the list of changes is either the same, or there is no list of changes included, then the client device is up-to-date.

At 514, the client device may determine whether to send another request to the transaction query engine based on comparing the transaction ID in the current token with a transaction ID in an immediately previously received token. If the transaction IDs are the same, the process may proceed to block 516. On the other hand, if the transaction IDs are different, the process may proceed to block 504 to send another request to the transaction query engine.

At 516, the client device data is up-to-date and the process may return to block 404 of FIG. 4 to await additional changes to the file system. As discussed above, the process of sending batches of changes from the transaction query engine with a new token, returning the new token by the client device to the transaction query engine, receiving a next batch of changes from the transaction query engine with a next new token and an incremented transaction identifier may be repeated until there are no more updates. At that point, the transaction query engine may send a token with a transaction ID of the latest transaction, and the client device may keep this token until the next file system change notification is received from the notification service. Additional information regarding the transaction query engine, the tokens, and updating the client devices, is included in International Application PCT/US2013/075855, filed Dec. 17, 2013, and its US national phase application U.S. application Ser. No. 14/915,423, filed Feb. 29, 2016, which are incorporated by reference herein in their entireties.

Figure 6:
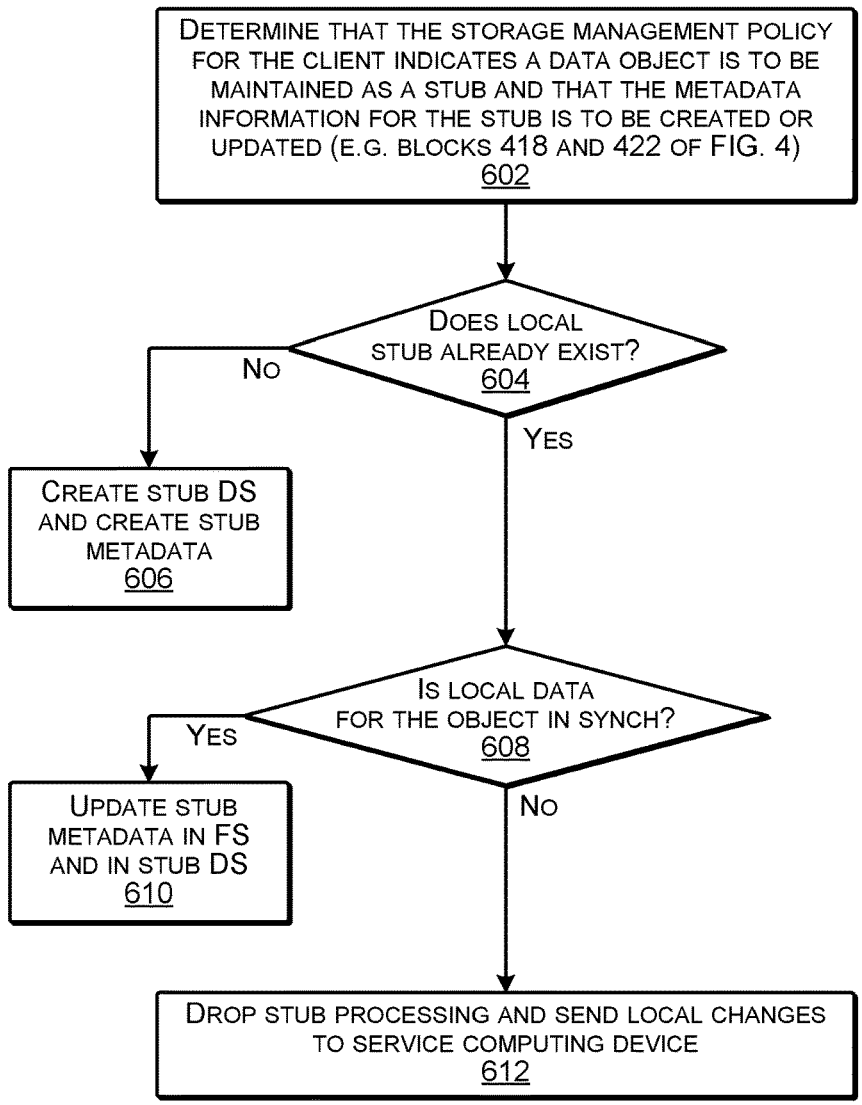
FIG. 6 is a flow diagram illustrating an example process for creating and/or updating metadata for a stub file according to some implementations.

FIG. 6 is a flow diagram illustrating an example process 600 for creating and/or updating metadata for a stub file or other stubbed data object according to some implementations. In some cases, the process 600 may be executed by the client device or other suitable computing device.

At 602, as discussed above with respect to blocks 418 and 422 of FIG. 4, the client device may determine that the data storage policy for the client device indicates that a data object is to be maintained as a stub file and that the metadata information for the stub file is to be created or updated based on the changes to the file system. As one example, the data object may be a file that has been updated on another client device.

At 604, the client device may determine whether a local stub file already exists for the data. If so, the process goes to block 608; if not, the process goes to block 606.

At 606, the client device may create a stub data structure for the data and create stub metadata for the data. For instance, in the case that the data object is newly added to the file system, such as a newly created file, the client device may create a new stub data structure for a new stub file and may determine the new stub file metadata for the new stub file from the information provided by the transaction query engine. Thus, the information received from the transaction query engine may include a hash of the file content and the other metadata values for the newly created stub file such as file creation time, file size, and/or other file properties. The hash of the file content may be stored in the stub data structure, while the other file metadata may be stored in the file system on the client device or in a separate metadata database maintained in the local storage on the client device.

At 608, on the other hand, if the data object already exists in the file system, the client device may determine whether there is any locally stored data for the data object that has not yet been synchronized with the service computing device. For example, if the user of the client device has made some changes to the data object, these changes may be lost if the changes are not synchronized with the service computing device before the data object is changed into a stub representation. As one example, the data synchronization service on the client device may refer to file synchronization information maintained by the client device to determine if any data changes have been made to file content, or other data content, that have not yet been synchronized. For example, the data synchronization service may maintain a database or other data structure of file synchronization information that indicates what data has been synchronized to the service computing device from the client device. If there is no local data, or if any local data has already been synchronized to the service computing device, the process goes to block 610. On the other hand, if the local data exists and has not already been synchronized to the service computing device, the process goes to block 612.

At 610, if there is no local data, or of any local data has already been synchronized to the service computing device, the client device may update the stub file metadata in the file system and in the stub data structure for the stub file. In the case that the data object is being converted to a stub file from a fully maintained file, the stub data structure may be created. As mentioned above, the client device may determine a hash of the content and other updated metadata from the information received from the transaction query engine, or in the cases that the latest content is present on the client device, the client device may calculate the hash from the content before deleting the content.

At 612, if there is local data that has not been synchronized to the service computing device, the client device may cease the stub processing and send the local changes to the service computing device for synchronization. As one example, the client device may resume the stub processing for the data object during the next update of changes to the file system as discussed above with respect to FIGS. 4 and 5.

Figure 7:
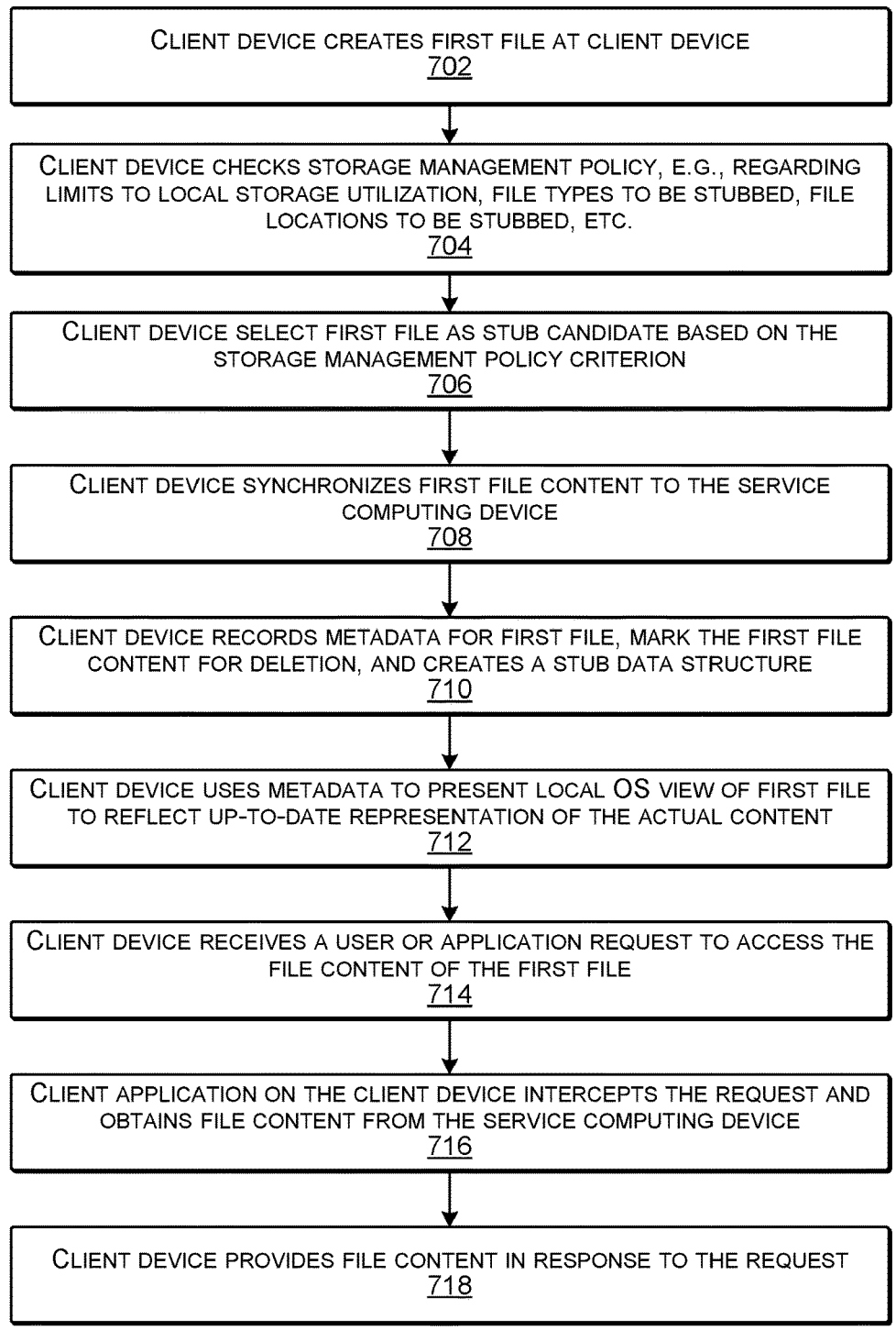
FIG. 7 is a flow diagram illustrating an example process for creating a stub file according to some implementations.

FIG. 7 is a flow diagram illustrating an example process 700 for creating a stub file for a file according to some implementations. In this example, the file may be created, e.g., in a private file system on the client device and synchronized to the service computing device. As mentioned above, the private file system may be associated with the client device based on user account or user identifier and user login credentials. As one example, the client device may determine to convert the local file to a stub file based on a storage management policy for the client device.

At 702, the client device may create a first file at the client device. For example, a user may use an application or other process to create a file at the client device.

At 704, the client device may check the storage management policy to determine whether the first file should be maintained as a stub file or as a fully maintained file. For example, the storage management policy may indicate which files may be stub files based on file type, limits to storage utilization, file storage location, default policy, or any of various other considerations discussed above.

At 706, the client device may select the first file as a stub file candidate based on one or more criteria of the storage management policy.

At 708, the client device may synchronize the file content of the first file to the service computing device. For example, the data synchronization service on the client device may maintain file synchronization information to keep track of which files have been fully synchronized to the service computing device and which files have not. Accordingly, based on the file synchronization information, the data synchronization service may ensure that the most up-to-date file content has been synchronized to the service computing device before converting a file into a stub file so that any changes to the file content are not lost when the file content is deleted from the file system.

At 710, the client device may record metadata for the first file, mark the first file content for deletion, and create a stub data structure. For example, when creating the stub data structure, the client device may calculate the hash of the first file content before deleting the first file content and may also determine the other stub file metadata values, such as file size, modification time, path, version number, and so forth.

At 712, the client device may use the stub file metadata to present a local operating system view of the first file to reflect an up-to-date representation of the actual file content of the first file. For instance, if the user were to open an operating system window to view the file system structure, the first file may be represented in the file system structure in the same manner as if the first file were entirely maintained on the client device.

At 714, the client device may receive a user request or application request to access file content of the first file. For instance, the request may be received through the operating system or through an application executing on the client device.

At 716, the client application on the client device may intercept the request and may obtain the file content from the service computing device. As one example, a file system filter driver or other operating system-level component associated with the client application may be configured to intercept file access requests directed to files that are stub files. When the request to access the content of the stub file is intercepted, the client application component may redirect the request to the service computing device. The server program on the service computing device may retrieve the file content from the network storage and send the file content to the requesting client device. In some cases, the client application may employ a data API, such as a REST API, to communicate with the service computing device.

At 718, the client device may provide the file content in response to the request. For example, when the file content has been received from the service computing device, the file system filter driver may respond to the requesting application and/or the user on the client device in a manner similar to that as if the file content had already been stored in the local storage on the client device.

Figure 8:
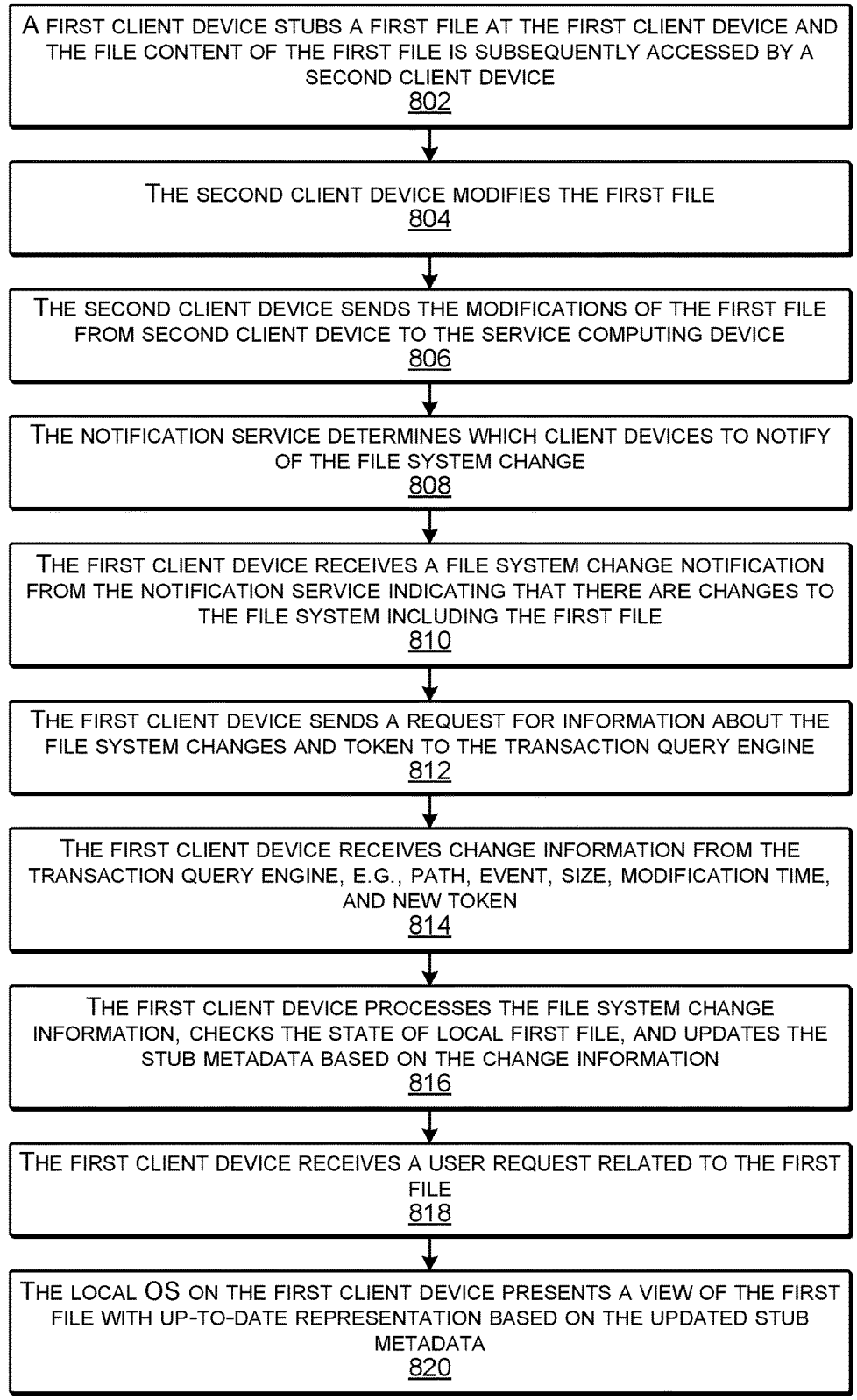
FIG. 8 is a flow diagram illustrating an example process for updating stub file information based on a remote update according to some implementations.

FIG. 8 is a flow diagram illustrating an example process 800 for updating stub file information based on a remote update according to some implementations. In some cases, the process 800 may be performed in an environment in which multiple client devices are able to access the same file such as in the case of a shared file system or a private file system implemented across multiple client devices.

At 802, the first client device may create a stub file for a first file at the first client device and the first file content of the first file may be subsequently accessed by a second client device. For example, as discussed above, the first client device may create a stub file for the first file by generating a stub data structure and obtaining or generating other stub metadata for the first file, and deleting the file content of the first file from the first client device.

At 804, the second client device may modify the first file. For example, the second client device may change the file content of the first file in comparison with the state of the file content when the stub file for the first file was created or last updated on the first client device.

At 806, the second client device may send the modifications of the first file from the second client device to the service computing device. For example, the second client device may synchronize the modifications to the service computing device for storage at the network storage.

At 808, the notification service on the service computing device may determine which client devices to notify of the file system change to the file system in which the first file is stored. For example, the notification service may access a file system database maintained at the service computing device that lists associations between various different client devices and various different file systems.

At 810, the first client device may receive a file system change notification from the notification service indicating that there are changes to the file system including the first file. Alternatively, in other examples, the notification service may be eliminated and the client device may periodically send a request for changes to the transaction query engine.

At 812, in response to receiving the notification, the first client device may send a request for information about the file system changes and a token to the transaction query engine. Additional details of the process are discussed above, e.g., with respect to FIGS. 4 and 5.

At 814, the first client device may receive change information from the transaction query engine and a new token. For example, the change information may include a path of the first file, an operation type, file size, file modification time, and the like. The new token may include a more recent transaction identifier for the file system.

At 816, the first client device may process the file system change information, check the state of the local first file, and update the stub file metadata based on the change information. For example, when updating the stub file metadata, the first client may determine the hash of the updated file content from the information provided by the transaction query engine, and may store the received hash in the stub data structure. Thus, the first client is able to update the metadata for the stub file including the path, the type of event, a modification time, the new size of the file, a hash of the actual updated file content, a version number of the file, and so forth, without having to download the updated file content.

At 818, the first client device may receive a user request related to the first file. For example, the user may open a window to view the file system that includes the first file.

At 820, the local operating system on the first client device may present a view of the first file with an up-to-date representation based on the updated stub metadata of the first file.

Figure 9:
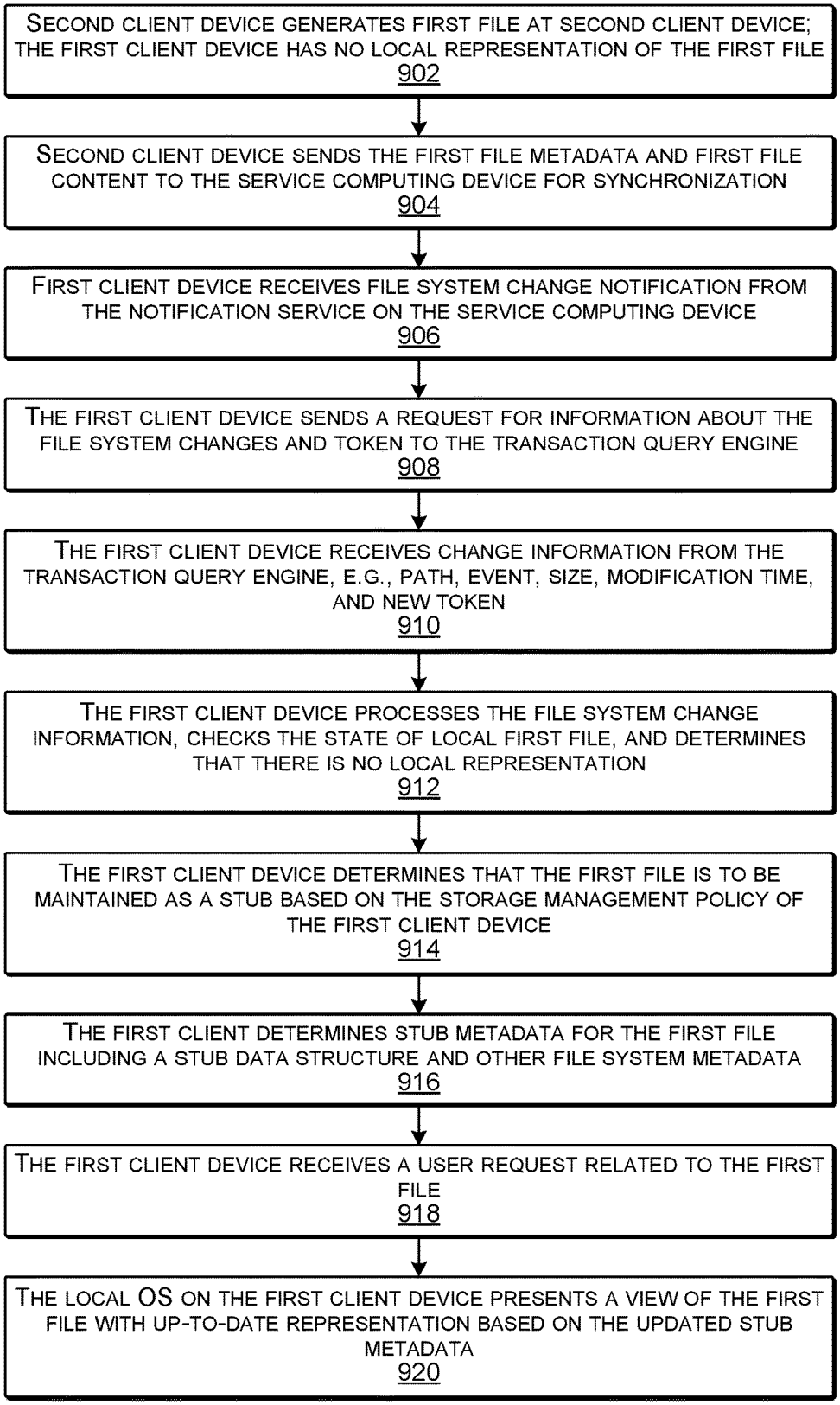
FIG. 9 is a flow diagram illustrating an example process for creating a stub file for a file that was created remotely according to some implementations.

FIG. 9 is a flow diagram illustrating an example process 900 for stubbing a file that was created remotely according to some implementations. In some cases, the process 900 may be performed in an environment in which multiple client devices are able to access the same file such as in the case of a shared file system or a private file system implemented on multiple client devices. Thus, in some examples, the process 900 may be executed by a first client device and a second client device.

At 902, the second client device may generate a first file at the second client device. In this example, the first client device currently has no local representation of the first file.

At 904, the second client device may send the first file metadata and first file content to the service computing device for synchronization.

At 906, the first client device may receive a file system change notification from the notification service on the service computing device.

At 908, the first client device may send a request for information about the file system changes and a token to the transaction query engine.

At 910, the first client device may receive a list of file system change information from the transaction query engine and a new token.

At 912, the first client device may process the file system change information, check the state of the local first file, and determine that there is no local representation of the first file.

At 914, the first client device may determine that the first file is to be maintained as a stub file based on the storage management policy of the first client device.

At 916, the first client device may determine stub file metadata for the first file including a stub data structure and other file system metadata for creating the stub file. For example, the first client device may obtain the stub file metadata information from the list of file system change information received from the transaction query engine, which may include the hash of the file content, file size, file path, file modification time, and so forth.

At 918, the first client device may receive a user request related to the first file. For example, the user of the first client device may open a window to view the file system including the first file.

At 920, the local operating system on the first client device may present a view of the first file with an up-to-date representation (e.g., up-to-date file metadata values, such as file size, most recent modification time, current path, etc.) based on the updated stub file metadata of the first file.

Figure 10:
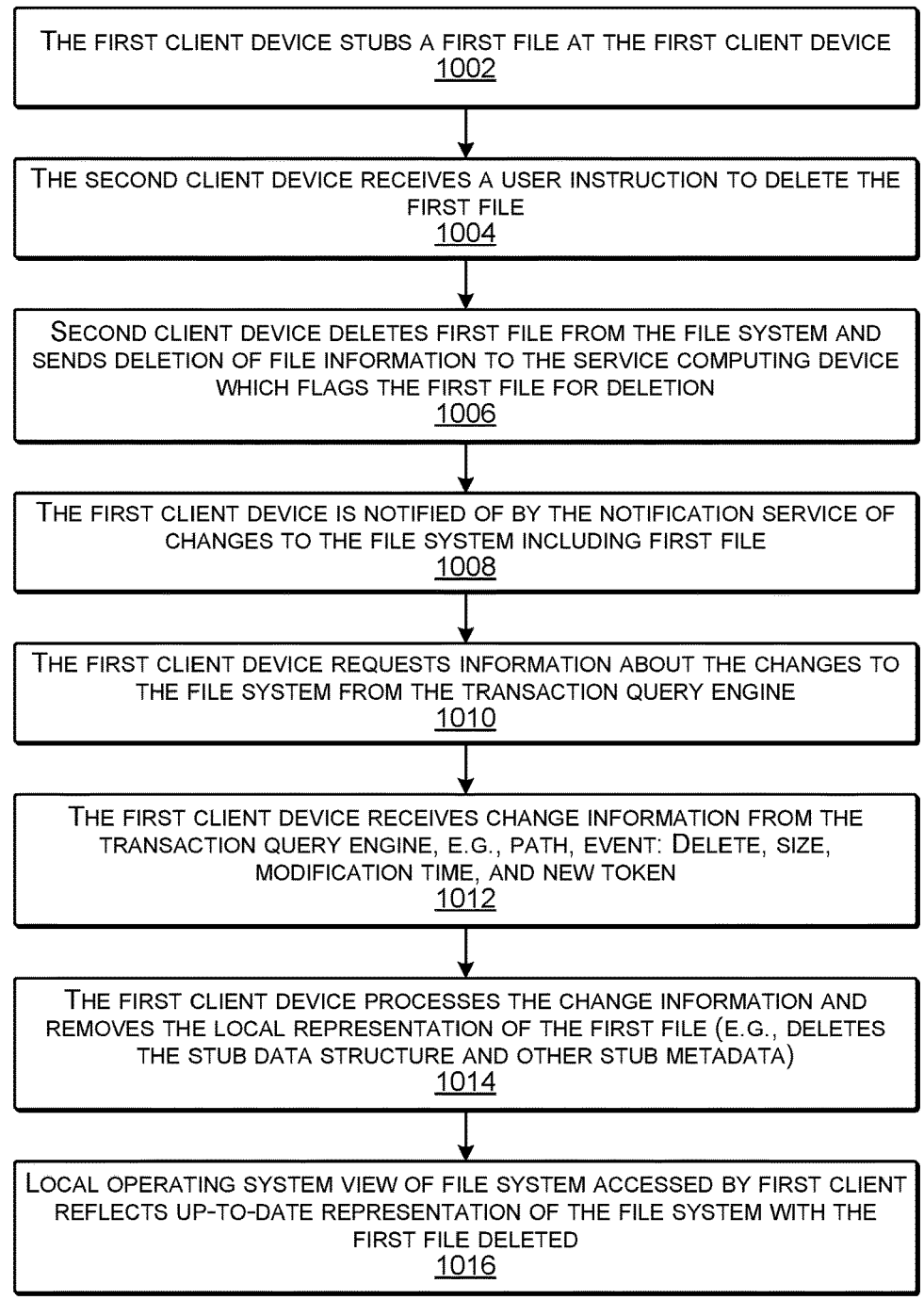
FIG. 10 is a flow diagram illustrating an example process in which a stub file is remotely deleted according to some implementations.

FIG. 10 is a flow diagram illustrating an example process 1000 in which a stub file is remotely deleted according to some implementations. In some cases, the process 1000 may be performed in an environment in which multiple client devices are able to access the same file such as in the case of a shared file system or a private file system implemented on multiple client devices. Thus, in some examples, the process 1000 may be executed by a first client device and a second client device.

At 1002, the first client device may create a stub of a first file in a file system at the first client device.

At 1004, the second client device may receive a user instruction to delete the first file from the file system.

At 1006, the second client device may delete the first file from the file system and send deletion of file information to the service computing device, which flags the first file for deletion from the network storage.

At 1008, the first client device may receive a file system change notification from the notification service on the service computing device.

At 1010, the first client device may request information about changes to the file system from the transaction query engine, and may include a token with the request.

At 1012, the first client device may receive change information from the transaction query engine and a new token. In this example, the change information may indicate that the event is deletion of the file.

At 1014, the first client device may process the change information and remove the local representation of the first file from the file system. For example, the first client device may delete the stub data structure and other stub file metadata from the file system on the first client device.

At 1016, when a user of the first client device accesses the file system, the local operating system view of the file system may reflect an up-to-date representation of the file system with the first file deleted therefrom. In addition, in some examples herein, a name change to a stub file may be treated as a combination of a file deletion operation and the file creation operation as discussed above.

FIG. 11 is a flow diagram illustrating an example process 1100 for mirroring data according to some implementations. The process 1100 illustrates that the client devices are able to perform both mirroring processes and stubbing processes concurrently, such as for any possible paths. In some cases, the process 1100 may be performed in an environment in which multiple client devices are able to access the same file such as in the case of a shared file system or a private file system implemented across multiple client devices. Thus, in some examples, the process 1100 may be executed by a first client device and a second client device.

At 1102, the second client device may generate a first file at the second client device. In this example, the first client device currently has no local representation of the first file.

At 1104, the second client device may send the first file metadata and first file content to the service computing device for synchronization.

At 1106, the first client device may receive a file system change notification from the notification service on the service computing device.

At 1108, the first client device may send a request for information about the file system changes and a token to the transaction query engine.

At 1110, the first client device may receive a list of change information from the transaction query engine and a new token.

At 1112, the first client device may process the file system change information, check the state of the local first file, and determine that there is no local representation of the first file.

At 1114, the first client device may determine from the storage management policy that the first file is to be maintained in a mirrored configuration on the first client device so that updates to the first file content are stored on the first client device.

At 1116, the first client device may download the file content of the first file and apply additional metadata to the metadata included in the change information received from the transaction query engine. For example, the additional metadata may be related to the mirroring relationship of the first file content maintained on the first client device, or the like.

At 1118, when a user of the first client device accesses the file system, the local operating system view of the file system may reflect an up-to-date representation of the file system with the first file content indicated to have an up-to-date mirrored status in the file system.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 12:
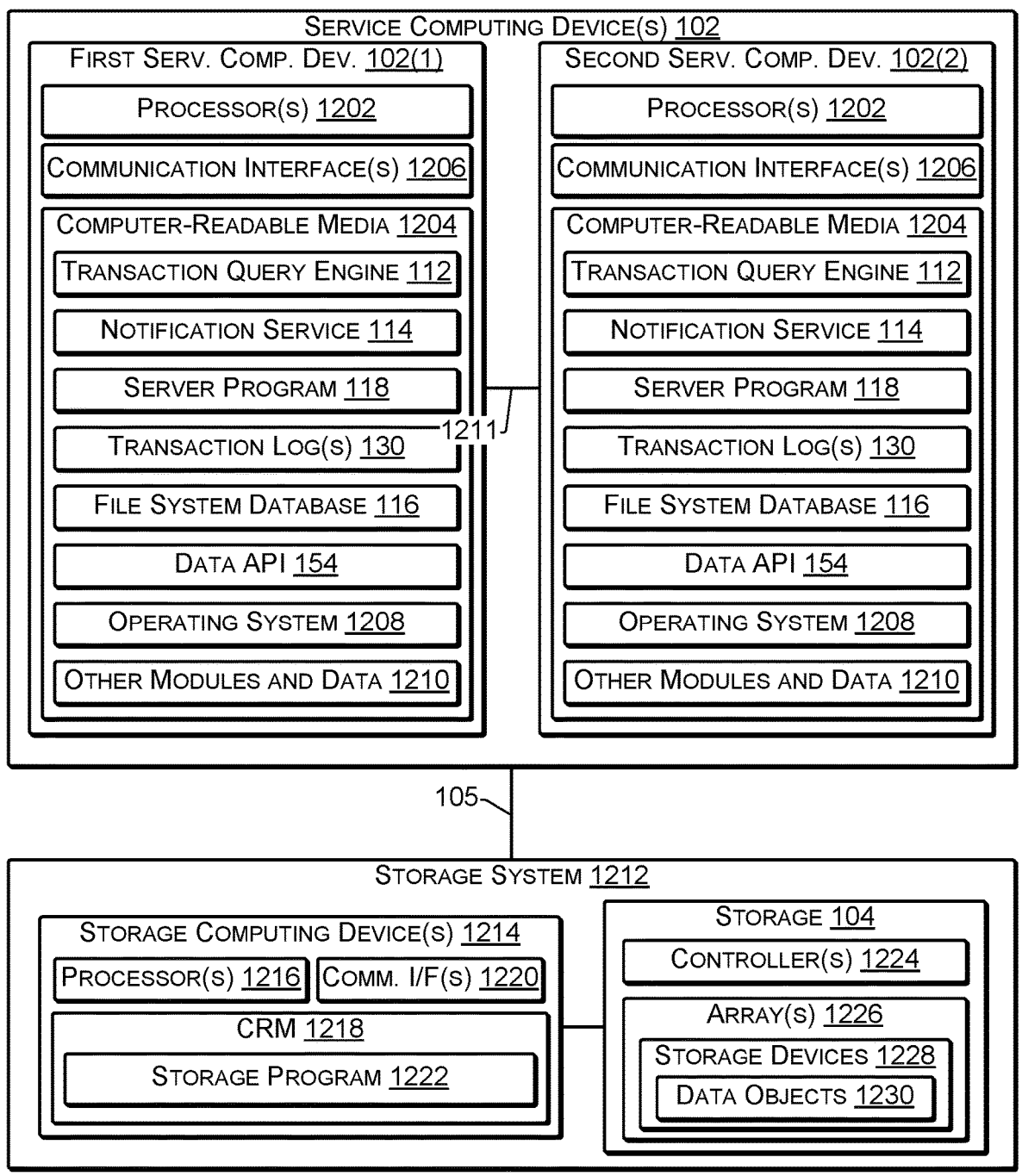
FIG. 12 illustrates an example configuration of the service computing device(s) and the storage according to some implementations.

FIG. 12 illustrates an example configuration of select components of the service computing device(s) 102 and the storage 104 according to some implementations. In some examples, the service computing device 102 may include one or more servers or other types of computing devices that may be embodied in any number of ways. For instance, in the case of a server, the modules, other functional components, and at least a portion of data storage may be implemented on at least one server, such as in a cluster of servers, a server farm or data center, a cloud-hosted computing service, and so forth, although other computer architectures may additionally or alternatively be used.

In the illustrated example, each service computing device 102 includes, or may have associated therewith, one or more processors 1202, one or more computer-readable media 1204, and one or more communication interfaces 1206. Each processor 1202 may be a single processing unit or a number of processing units, and may include single or multiple computing units, or multiple processing cores. The processor(s) 1202 can be implemented as one or more central processing units, microprocessors, microcomputers, microcontrollers, digital signal processors, state machines, logic circuitries, and/or any devices that manipulate signals based on operational instructions. For instance, the processor(s) 1202 may be one or more hardware processors and/or logic circuits of any suitable type specifically programmed or configured to execute the algorithms and processes described herein. The processor(s) 1202 can be configured to fetch and execute computer-readable instructions stored in the computer-readable media 1204, which can program the processor(s) 1202 to perform the functions described herein.

The computer-readable media 1204 may include volatile and nonvolatile memory and/or removable and non-removable media implemented in any type of technology for storage of digital information, such as computer-readable instructions, data structures, program modules, or other data. For example, the computer-readable media 1204 may include, but is not limited to, RAM, ROM, EEPROM, flash memory or other memory technology, optical storage, solid state storage, magnetic disk storage, RAID storage systems, storage arrays, network attached storage, storage area networks, cloud storage, or any other medium that can be used to store the desired information and that can be accessed by a computing device. Depending on the configuration of the service computing device 102, the computer-readable media 1204 may be a tangible non-transitory medium to the extent that, when mentioned, non-transitory computer-readable media exclude media such as energy, carrier signals, electromagnetic waves, and/or signals per se. In some cases, the computer-readable media 1204 may be at the same location as the service computing device 102, while in other examples, the computer-readable media 1204 may be partially remote from the service computing device 102. For instance, in some cases, the computer-readable media 1204 may include a portion of storage in the storage 104.

The computer-readable media 1204 may be used to store any number of functional components that are executable by the processor(s) 1202. In many implementations, these functional components comprise instructions or programs that are executable by the processor(s) 1202 and that, when executed, specifically program the processor(s) 1202 to perform the actions attributed herein to the service computing device 102. Functional components stored in the computer-readable media 1204 may include the transaction query engine 112, the notification service 114, and the server program 118, each of which may include one or more computer programs, applications, executable code, or portions thereof. For example, the server program 118 may provide communication functionality with the client computing devices 108 and the storage system 104. Additional functional components stored in the computer-readable media 1204 may include an operating system 1208 for controlling and managing various functions of the service computing device 102. In some cases, the functional components may be stored in a storage portion of the computer-readable media 1204, loaded into a local memory portion of the computer-readable media 1204, and executed by the one or more processors 1202.

In addition, the computer-readable media 1204 may store data and data structures used for performing the functions and services described herein. For example, the computer-readable media 1204 may store the transaction log(s) 130, the file system database 116, and the data API 154. The service computing device 102 may also include or maintain other functional components and data, such as other modules and data 1210, which may include programs, drivers, etc., and the data used or generated by the functional components. Further, the service computing device 102 may include many other logical, programmatic, and physical components, of which those described above are merely examples that are related to the discussion herein.

The communication interface(s) 1206 may include one or more interfaces and hardware components for enabling communication with various other devices, such as over the network(s) 105 and 106. Thus, the communication interfaces 1206 may include, or may couple to, one or more ports that provide connection to the network(s) 105 for communicating with the storage system 104, and one or more ports that provide connection to the network(s) 106 for communication with the client computing devices 108 or other computing devices. For example, the communication interface(s) 1206 may enable communication through one or more of a LAN, the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein.

The example of FIG. 12 illustrates one possible example configuration of the one or more service computing device(s) 102 according to some implementations. In this example, a first service computing device 102(1) may be coupled to a second service computing device 102(2). For example, the first service computing device 102(1) and second service computing device 102(2) may together form a computing device for providing storage and data management services to a plurality of the client computing devices 108 (not shown in FIG. 12). In some examples, the first service computing device 102(1) may act as a master or primary computing device, while the second service computing device 102(2) may act as a slave or secondary computing device, at least with respect to maintaining the transaction logs 130 and file system database 116. For instance, the server program 118, the notification service 114 and/or the transaction query engine 112 on the first service computing device 102(1) may update and maintain the transaction logs 130 and the file system database 116 on the first service computing device 102(1). As indicated at 1211, the server program 118 or other program on the first service computing device 102(1) may replicate the transaction logs 130 and the file system database 122 to the second service computing device 102(2). Accordingly, should the first service computing device 102(1) suffer a failure, the second service computing device 102(2) may assume the role of primary computing device while the first service computing device 102(1) is replaced with a different service computing device (not shown in FIG. 2) and/or repaired. During this time, the second service computing device 102(2) may perform the data management services for file stubbing discussed above.

In the illustrated example, the storage 104 is maintained in a storage system 1212, although implementations herein are not limited to the storage examples shown and/or described herein. The storage system 1212 may include one or more storage computing devices 1214, which may include one or more servers or any other suitable computing device, such as any of the examples discussed above with respect to the service computing device 102. The storage computing device(s) 140 may each include one or more processors 1216, one or more computer-readable media (CRM) 1218, and one or more communication interfaces (I/Fs) 1220. For example, the processors 1216 may correspond to any of the examples discussed above with respect to the processors 1202, the computer-readable media 1218 may correspond to any of the examples discussed above with respect to the computer-readable media 1204, and the communication interfaces 1220 may correspond to any of the examples discussed above with respect to the communication interfaces 1206.

In addition, the computer-readable media 1218 may include a storage program 1222 as a functional component executed by the one or more processors 1202 for managing the storage of data on the storage 104 included in the storage system 1212. The storage 104 may include one or more controllers 1224 associated with the storage 104 for storing data on one or more arrays 1226 of storage devices 1228. For instance, the controller 1224 may control the array 1226, such as for configuring the array 1226 in a RAID configuration, or the like, and/or for presenting logical units to the storage program 1222 based on the storage devices 1228, and for managing data, such as data objects 1230, stored on the underlying physical storage devices 1228. The data objects 1230 may correspond to the file content, file metadata, and other data discussed herein. The storage devices 1228 may be any type of storage device, such as hard disk drives, solid state drives, optical drives, magnetic tape, combinations thereof, and so forth. In some examples, the one or more arrays 1226 may include a thin-provisioning array configured to provide on-demand storage capacity. Furthermore, the example of FIG. 12 is just one example of a possible configuration of the one or more service computing device(s) 102 and the storage 104. Numerous other configurations will be apparent to those of skill in the art having the benefit of the disclosure herein.

Figure 13:
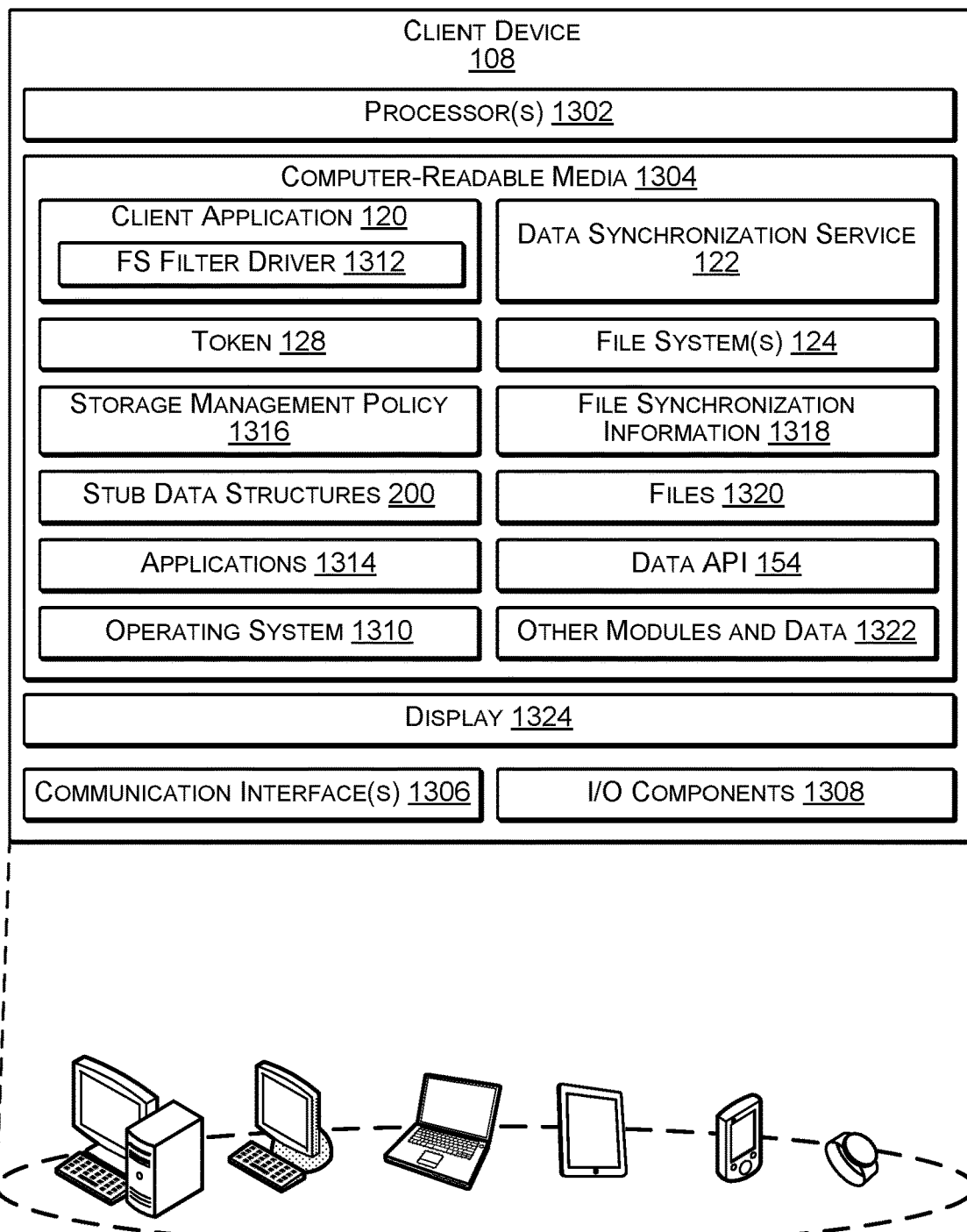
FIG. 13 illustrates an example configuration of a client device according to some implementations.

FIG. 13 illustrates select example components of an example client device 108 according to some implementations. Each client computing device 108 may be any suitable type of computing device such as a workstation, desktop, laptop, tablet computing device, mobile device, smart phone, wearable computing device, or any other type of computing device able to send and receive data over a network. Furthermore, the client computing devices 108 may be able to communicate with the one or more service computing devices 102 through the one or more networks 106, through separate networks, or through any other suitable type of communication connection. Numerous other variations may be apparent to those of skill in the art having the benefit of the disclosure herein.

In a basic configuration, the client device 108 includes components such as at least one processor 1302, one or more computer-readable media 1304, one or more communication interfaces 1306, and the one or more input/output (I/O) components 1308. Each processor 1302 may itself comprise one or more processors or processing cores. For example, each processor 1302 may be implemented as one or more microprocessors, microcomputers, microcontrollers, digital signal processors, central processing units, state machines, logic circuitries, and/or any devices that manipulate signals based on operational instructions. In some cases, the processor 1302 may include one or more hardware processors and/or logic circuits of any suitable type specifically programmed or configured to execute the processes and other algorithms described herein. The processor 1302 may be configured to fetch and execute computer-readable processor-executable instructions stored in the computer-readable media 1304.

Depending on the configuration of the client device 108, the computer-readable media 1304 may be an example of tangible non-transitory computer-readable media and may include volatile and nonvolatile memory and/or removable and non-removable media implemented in any type of technology for storage of information such as computer-readable processor-executable instructions, data structures, program modules, or other data. The computer-readable media 1304 may include, but is not limited to, RAM, ROM, EEPROM, flash memory, solid-state storage, optical storage, magnetic disk storage, magnetic tape, and/or other types of storage technology. Further, in some cases, the client device 108 may access external storage, such as directly, through another computing device, or through a network. Accordingly, the computer-readable media 1304 may be computer storage media able to store instructions, programs, or software code that may be executed by the processor 1302.

The computer-readable media 1304 may be used to store and maintain any number of functional components that are executable by the processor 1302. In some implementations, these functional components comprise instructions or programs that are executable by the processor 1302 and that, when executed, implement operational logic for performing the actions and services attributed above to the client devices 108. Functional components of the client device 108 stored in the computer-readable media 1304 may include the client application 120 and the data synchronization service 122, as discussed above. Additional functional components may include an operating system 1310 for controlling and managing various functions of the client device 108 and for enabling basic user interactions with the client device 108. In some examples, the client application 120 may include, or may access, a file system filter driver 1312, or similar component able to interact with an operating system for intercepting file access requests directed to stub files, as discussed above. The computer-readable media 1304 may further include the one or more applications 1314 that may be executed on the client devices 108 for performing various functions and tasks.

In addition, the computer-readable media 1304 may also store data, data structures and the like, that are used by the functional components. For example, data and data structures stored by the computer-readable media 1304 may include one or more tokens 128, one or more files systems 124, a storage management policy 1316, file synchronization information 1318, the data API 154, stub data structures 200, and the user's profile information 402. Depending on the type of the client device 108, the computer-readable media 1304 may also optionally include other functional components and data, such as other modules and data 1322, which may include programs, drivers, etc., and the data used or generated by the functional components. Further, the client device 108 may include many other logical, programmatic, and physical components, of which those described are merely examples that are related to the discussion herein.

The client device 108 may further include the one or more communication interfaces 1306. The communication interface(s) 1306 may include one or more interfaces and hardware components for enabling communication with various other devices, such as over the network(s) 105 and 106. Thus, the communication interfaces 1306 may include, or may couple to, one or more ports that provide connection to the network(s) 105 for communicating with the storage system 104, and one or more ports that provide connection to the network(s) 106 for communication with the service computing devices 102 or other computing device. For example, the communication interface(s) 1306 may enable communication through one or more of a LAN (local area network), WAN (wide area network), the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein.

The client device 108 may further include the I/O components 1308, such as speakers, a microphone, a camera, and various user controls (e.g., buttons, a joystick, a keyboard, a keypad, a touch screen, etc.), a haptic output device, and so forth. For example, the operating system 1310 of the client device 108 may include suitable drivers configured to accept input from a keypad, keyboard, or other user controls and devices included with the I/O components 1308. In addition, the client device 108 may include a display 1324, which may be passive, emissive or any other form of display. Additionally, the client device 108 may include various other components that are not shown, examples of which include various types of sensors, a Global Positioning System device, a power source, such as a battery and power control unit, and so forth.

Various instructions, processes, and techniques described herein may be considered in the general context of computer-executable instructions, such as program modules stored on computer-readable media, and executed by the processor(s) herein. Generally, program modules include routines, programs, objects, components, data structures, executable code, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A system comprising:
 a service computing device; and
 a first client device associated with a first user and able to communicate with the service computing device over a network;
 the first client device configured by executing a first application to perform operations comprising:
  sending, by the first client device, to the service computing device, a request for information related to a change to a file system;
  receiving, by the first client device, from the service computing device, a list of one or more changes to the file system including a change to a first file received by the service computing device from a second client device associated with a second user;
  receiving, based at least on the list of one or more changes, first file metadata including a first file-content hash calculated by the second client device from file content of the first file following the change to the first file;
  creating or updating, by the first client device, a stub file corresponding to the first file based at least partially on the received list of one or more changes, the stub file including a stub data structure stored on a local storage of the first client device, wherein the first client device creates or updates the stub file to include, in the stub data structure, the first file-content hash calculated by the second client device, wherein the file content of the first file is stored by the service computing device at a storage over the network;
  receiving, by the first client device, a first user input to access the file content of the first file via a request directed to the stub file on the first client device;

intercepting, by an operating-system-level component of the first application executing on the first client device, the request directed to the stub file, and redirecting, to the service computing device, the request directed to the stub file as a request for the file content of the first file;

receiving, by the first client device, from the service computing device, retrieved file content retrieved by the service computing device in response to the redirected request for the file content of the first file;

verifying, based on the first file-content hash included in the stub data structure, that the retrieved file content is the file content of the first file;

responding to the first user input based on receipt of the file content of the first file from the service computing device;

receiving, by the first client device, a second user input including an update to the file content of the first file;

synchronizing the updated file content of the first file with the service computing device over the network;

determining, based at least on a storage management policy, whether the first file is to be represented as the stub file on the first client device or maintained as a local file including the updated file content of the first file;

based at least on determining that the first file is to be represented as a stub file, calculating a second file-content hash from the updated file content of the first file;

updating the stub data structure with the second file-content hash calculated from the updated file contents; and based on determining that the first file is to be represented as the stub file and further based on updating the stub data structure with the second file-content hash, deleting the updated file content of the first file from the local storage on the first client device.

2. The system as recited in claim 1, wherein the first client device sends the second file-content hash to the service computing device for updating a stub data structure on the second client device.

3. The system as recited in claim 1, wherein the updated stub data structure further includes a data status indicator that indicates that the updated file content of the first file corresponding to the stub file has been deleted from the local storage on the first client device.

4. The system as recited in claim 1, wherein the first file metadata received based on the one or more changes comprises at least one of: a file size, a file modification time, a file path, or a file version.

5. The system as recited in claim 1, wherein sending the request for information includes sending a token with the request, the token including a file system identifier of the file system, mountpoint information associated with the file system identifier, and a prior transaction identifier that identifies a file system change that has already been processed by the client device, wherein the mountpoint information indicates which information stored in the file system is information that is shared with other client devices and which information is private information for the first client device.

6. The system as recited in claim 5, wherein the token was received from the service computing device with a previous list of one or more changes to the file system, the operations further comprising receiving, with the list of one or more changes to the file system, another token that includes an updated transaction identifier.

7. The system as recited in claim 1, the operations further comprising:

registering the file system with a notification service at the service computing device to configure the service computing device to send the change notifications for changes made to the file system to the first client device.

8. The system as recited in claim 7, the operations further comprising:

sending, to the service computing device, the request for information related to the change to the file system, the request including a token, the token including a file system identifier and a prior transaction identifier that identifies a file system change that has already been processed by the first client device; and receiving, by the first client device, from the service computing device, the indication of the change to the file system and a token including an updated transaction identifier.

9. The system as recited in claim 1, wherein the service computing device is configured to perform operations comprising:

receiving, from the second client device associated with the second user, the change to the first file in the file system; and in response to the change to the first file received from the second client device associated with the second user, and based on determining that the first client device is registered to receive change notifications for changes made to the file system, sending, to the first client device, a change notification that notifies the first client device of the change to the file system.

10. The system as recited in claim 1, the operations further comprising:

determining that the list of one or more changes to the file system includes creation of the first file corresponding to the stub file by the second client device to add the first file to the file system, wherein the first client device creates the stub data structure and adds the stub file metadata to the file system based on the list of one or more changes received from the service computing device.

11. The system as recited in claim 1, the operations further comprising:

determining that the list of one or more changes to the file system includes a change to the file content of the first file corresponding to the stub file made by the second client device, wherein the first client device updates the stub data structure by replacing an existing file-content hash in the stub data structure with the first file-content hash calculated by the second client device.

12. The system as recited in claim 1, the operations further comprising:

receiving from the service computing device a subsequent list of one or more changes to the file system;

determining that the subsequent list of one or more changes to the file system includes deletion of the first file corresponding to the stub file from the file system by the second client device; and based on the subsequent list including deletion of the first file, deleting, by the first client device, the stub data structure from the local storage.

13. A method comprising:

sending, by a first client device associated with a first user, to a service computing device over a network, a request for information related to a change to a file system associated with the first client device;

receiving, by the first client device, from the service computing device, a list of one or more changes to the file system including a change to a first file received, by the service computing device, from a second client device associated with a second user;

receiving, based at least on the list of one or more changes, first file metadata including a first file-content hash calculated by the second client device from file content of the first file following the change to the first file;

creating or updating, by the first client device, a stub file corresponding to the first file based at least partially on the received list of one or more changes, the stub file including a stub data structure stored on a local storage of the first client device, wherein the first client device creates or updates the stub file to include, in the stub data structure, the first file-content hash calculated by the second client device, wherein the file content of the first file is stored by the service computing device at a storage over the network;

receiving, by the first client device, a first user input to access the file content of the first file via a request directed to the stub file on the first client device;

intercepting, by an operation-system-level component of the first application executing on the first client device, the request directed to the stub file, and redirecting, to the service computing device, the request directed to the stub file as a request for the file content of the first file;

receiving, by the first client device, from the service computing device, retrieved file content retrieved by the service computing device in response to the redirected request for the file content of the first file;

verifying, based on the first file-content hash included in the stub data structure, that the retrieved file content is the file content of the first file;

responding to the first user input based on receipt of the file content of the first file from the service computing device;

receiving, by the first client device, a second user input including an update to the file content of the first file;

synchronizing the updated file content of the first file with the service computing device over the network;

determining, based at least on a storage management policy, whether the first file is to be represented as the stub file on the first client device or maintained as a local file including the updated file content of the first file;

based at least on determining that the first file is to be represented as a stub file, calculating a second file-content hash from the updated file content of the first file;

updating the stub data structure with the second file-content hash calculated from the updated file contents; and based on determining that the first file is to be represented as the stub file and further based on updating the stub data structure with the second file-content hash, deleting the updated file content of the first file from the local storage on the first client device.

14. One or more non-transitory computer-readable media storing instructions that, when executed by one or more processors of a first client device, program the one or more processors to perform operations comprising:

sending, by the first client device associated with a first user, to a service computing device over a network, a request for information related to a change to a file system associated with the first client device;

receiving, by the first client device, from the service computing device, a list of one or more changes to the file system including a change to a first file received, by the first service computing device, from a second client device associated with a second user;

receiving, based at least on the list of one or more changes, first file metadata including a first file-content hash calculated by the second client device from file content of the first file following the change to the first file;

creating or updating, by the first client device, stub file corresponding to the first file based at least partially on the received list of one or more changes, the stub file including a stub data structure stored on a local storage of the first client device, wherein the first client device creates or updates the stub file to include, in the stub data structure, the first file-content hash calculated by the second client device, wherein the file content of the first file is stored by the service computing device at a storage over the network;

receiving, by the first client device, a first user input to access the file content of the first file via a request directed to the stub file on the first client device;

intercepting, by an operating-system-level component of the first application executing on the first client device, the request directed to the stub file, and redirecting, to the service computing device, the request directed to the stub file as a request for the file content of the first file;

receiving by the first client device, from the service computing device, retrieved file content retrieved file content retrieved by the service computing device in response to the redirected request for the file content of the first file;

verifying, based on the first file-content hash included in the stub data structure, that the retrieved file content is the file content of the first file;

responding to the first user input based on receipt of the file content of the first file from the service computing device;

receiving, by the first client device, a second user input including an update to the file content of the first file;

synchronizing the updated file content of the first file with the service computing device over the network;

determining, based at least on a storage management policy, whether the first file is to be represented as the stub file on the first client device or maintained as a local file including the updated file content of the first file;

based at least on determining that the first file is to be represented as a stub file, calculating a second file-content hash from the updated file content of the first file;

updating the stub data structure with the second file-content hash calculated from the updated file contents; and based on determining that the first file is to be represented as the stub file and further based on updating the stub data structure with the second file-content hash, deleting the updated file content of the first file from the local storage on the first client device.

15. The one or more non-transitory computer-readable media as recited in claim 14, the one or more processors configured to perform operations further comprising:
- sending, by the first client device, to the service computing device, the request for information related to the change to the file system, the request for information including a first token, the first token including a file system identifier and a prior transaction identifier that identifies a file system change that has already been processed by the first client device; and
- receiving, by the first client device, from the service computing device, with the list of one or more changes to the file system, a second token including an updated transaction identifier.

16. The method as recited in claim 13, further comprising:
- sending, by the first client device, to the service computing device, the request for information related to the change to the file system, the request for information including a first token, the first token including a file system identifier and a prior transaction identifier that identifies a file system change that has already been processed by the first client device; and
- receiving, by the first client device, from the service computing device, with the list of one or more changes to the file system, a second token including an updated transaction identifier.

17. The method as recited in claim 13, further comprising registering the first client device with a notification service at the service computing device to configure the service computing device to send the change notifications for changes made to the file system to the first client device.

* * * * *